US012602601B2

(12) United States Patent
Nakamura et al.

(10) Patent No.: US 12,602,601 B2
(45) Date of Patent: Apr. 14, 2026

(54) PROGRAM FOR OPERATING CELL CULTURE SUPPORT APPARATUS, CELL CULTURE SUPPORT APPARATUS, AND METHOD FOR OPERATING CELL CULTURE SUPPORT APPARATUS

(71) Applicant: FUJIFILM Corporation, Tokyo (JP)

(72) Inventors: Naoki Nakamura, Kanagawa (JP); Masataka Hasegawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1073 days.

(21) Appl. No.: 17/102,508

(22) Filed: Nov. 24, 2020

(65) Prior Publication Data

US 2021/0081825 A1     Mar. 18, 2021

Related U.S. Application Data

(63) Continuation of application No. PCT/JP2019/021821, filed on May 31, 2019.

(30) Foreign Application Priority Data

Jul. 24, 2018     (JP) ................................. 2018-138740

(51) Int. Cl.
*G06N 5/04*         (2023.01)
*G06N 20/00*        (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS

2007/0207538 A1     9/2007   Amano
2018/0245041 A1     8/2018   Tanabe et al.

FOREIGN PATENT DOCUMENTS

EP          1818188 A1       8/2007
JP       2007-202500 A       8/2007
(Continued)

OTHER PUBLICATIONS

Japanese Office Action dated Jul. 11, 2023 for corresponding Application No. 2022-084135 with an English translation.
(Continued)

*Primary Examiner* — Anna Skibinsky
*Assistant Examiner* — Joseph Pulliam
(74) *Attorney, Agent, or Firm* — Birch, Stewart, Kolasch & Birch, LLP

(57)     ABSTRACT
A program for operating a cell culture support apparatus causes a computer to acquire a learned model, derived by performing machine learning on the basis of a set of time-series data for learning indicating a time transition of an amount of each of plural types of components constituting a medium used for cell culture and good/bad data indicating good or bad of a result of the cell culture in correspondence with the time-series data for learning, indicating a guideline of the amount, acquire time-series data for analysis indicating the time transition of the amount, derive quantitative guideline information of the amount for obtaining a good result in the cell culture, with respect to at least one of the plural types of components, from the learned model and input data of at least a part of the time-series data for analysis acquired, and output guideline information.

7 Claims, 23 Drawing Sheets

(56)                 References Cited

FOREIGN PATENT DOCUMENTS

| | | | |
|---|---|---|---|
| JP | WO/2019/163304 | * | 8/2019 |
| JP | 2019193587 A | * | 11/2019 |
| WO | WO 2017/038887 A1 | | 3/2017 |

OTHER PUBLICATIONS

Japanese Office Action for Japanese Application No. 2020-532191, dated Feb. 22, 2022, with English translation.
Bruhlmann et al., "Parallel Experimental Design and Multivariate Analysis Provides Efficient Screening of Cell Culture Media Supplements to Improve Biosimilar Product Quality," Biotechnology and Bioengineering, vol. 114, No. 7, Jul. 2017, pp. 1448-1458.
Japanese Office Action for corresponding Japanese Application No. 2022-084135, dated Apr. 18, 2023, with English translation.
Kovalchuk et al., "Modeling some mineral nutrient requirements for micropropagated wild apricot shoot cultures," Plant Cell Tiss Organ Cult, vol. 129, 2017 (Published online Feb. 2, 2017), pp. 325-335.
Extended European Search Report, dated Apr. 29, 2021, for corresponding European Application No. 19841672.9.
Wysotzki, "Machine Learning and its Application to Process Control," Operations Research. 1991 (Jan. 1, 1991), pp. 72, XP065795675.
Japanese Office Action for Japanese Application No. 2020-532191, dated Nov. 30, 2021, with English translation.
European Office Action dated Oct. 9, 2023 for corresponding Application No. 19 841 672.9.
International Preliminary Report on Patentability and Written Opinion of the International Searching Authority with an English translation (forms PCT/IB/373, PCT/ISA/237 and PCT/IB/326), dated Feb. 4, 2021, for corresponding International Application No. PCT/JP2019/021821.
International Search Report (form PCT/ISA/210), dated Sep. 3, 2019, for corresponding International Application No. PCT/JP2019/021821, with an English translation.

* cited by examiner

FIG. 3

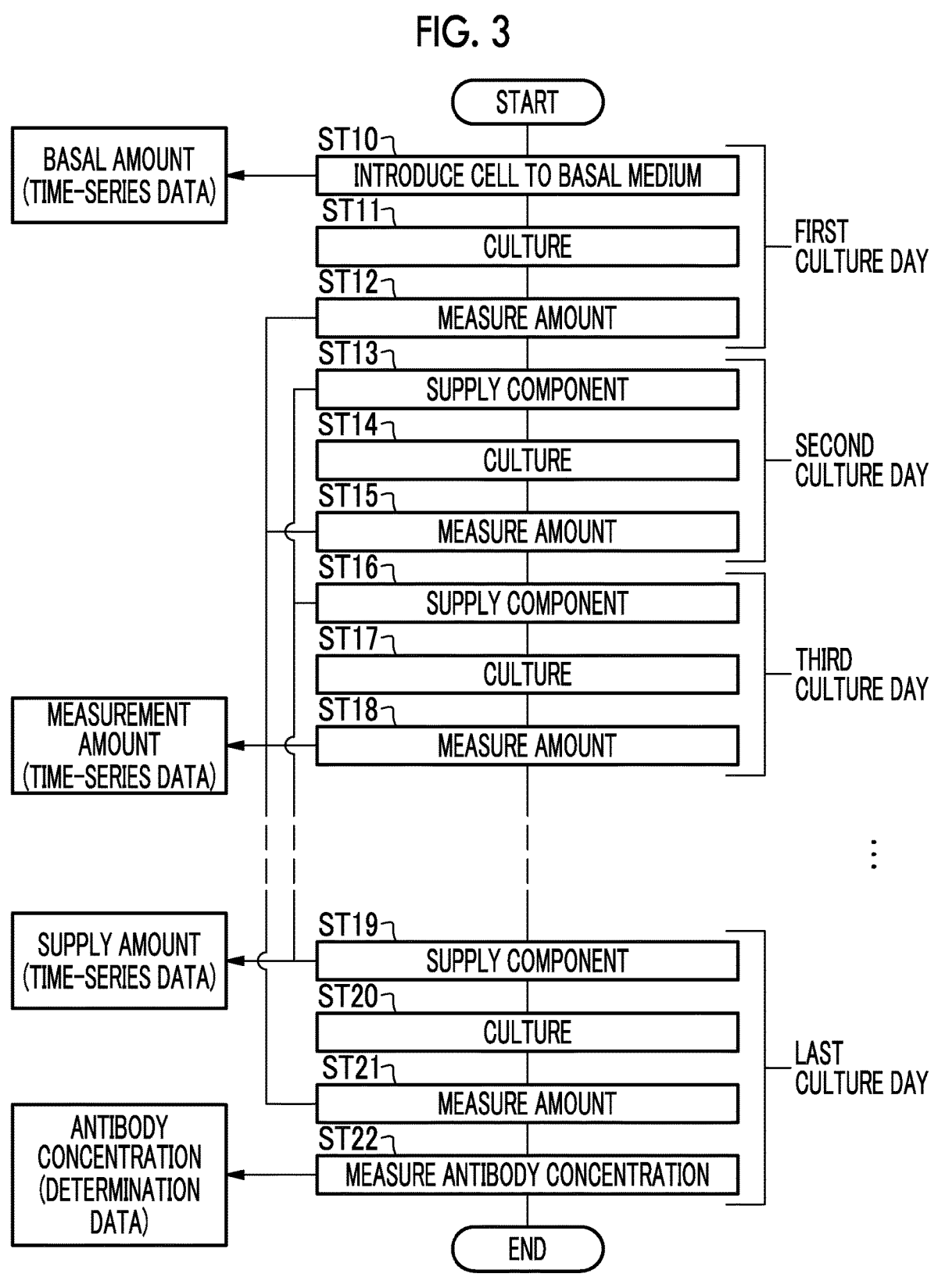

START

ST10
BASAL AMOUNT (TIME-SERIES DATA) ← INTRODUCE CELL TO BASAL MEDIUM

ST11
CULTURE

ST12
MEASURE AMOUNT

⎤ FIRST CULTURE DAY

ST13
SUPPLY COMPONENT

ST14
CULTURE

ST15
MEASURE AMOUNT

⎤ SECOND CULTURE DAY

ST16
SUPPLY COMPONENT

ST17
CULTURE

ST18
MEASUREMENT AMOUNT (TIME-SERIES DATA) ← MEASURE AMOUNT

⎤ THIRD CULTURE DAY

ST19
SUPPLY AMOUNT (TIME-SERIES DATA) ← SUPPLY COMPONENT

ST20
CULTURE

ST21
MEASURE AMOUNT

ST22
ANTIBODY CONCENTRATION (DETERMINATION DATA) ← MEASURE ANTIBODY CONCENTRATION

⎤ LAST CULTURE DAY

END

TIME-SERIES DATA FOR LEARNING

65C

GUIDELINE INFORMATION
(RELATING TO ADDITION AMOUNT)

$F\_Cw7 > 1.84$

100

CELL CULTURE
SUPPORT APPLICATION     ~GUIDELINE INFORMATION
DISPLAY SCREEN~

CULTURE PURPOSE: MEDICINE $\alpha$     CULTURE ID: 001

GUIDELINE INFORMATION 1

PLEASE SET SUPPLY AMOUNT OF
COMPONENT Cw ON THE SEVENTH
CULTURE DAY TO BE GREATER THAN
1.84 mg.

GUIDELINE INFORMATION
(RELATING TO ADDITION AMOUNT)

$F\_Cy5 + F\_Cy6 \leq 21.368,\ F\_Cz5 \leq 298.1$

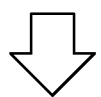

100

| CELL CULTURE SUPPORT APPLICATION | ~GUIDELINE INFORMATION DISPLAY SCREEN~ |

CULTURE PURPOSE: MEDICINE $\alpha$      CULTURE ID: 001

GUIDELINE INFORMATION 1

PLEASE SET SUM OF SUPPLY AMOUNTS OF COMPONENT Cy ON THE FIFTH AND SIXTH CULTURE DAYS TO BE EQUAL TO OR LESS THAN 21.368 mg.

GUIDELINE INFORMATION 2

PLEASE SET SUPPLY AMOUNT OF COMPONENT Cz ON THE FIFTH CULTURE DAY TO BE EQUAL TO OR LESS THAN 298.1 mg.

OK ~101

PROGRAM FOR OPERATING CELL CULTURE SUPPORT APPARATUS, CELL CULTURE SUPPORT APPARATUS, AND METHOD FOR OPERATING CELL CULTURE SUPPORT APPARATUS

CROSS-REFERENCE TO RELATED APPLICATIONS

This application is a continuation application of International Application No. PCT/JP2019/021821, filed May 31, 2019, the disclosure of which is incorporated herein by reference in its entirety. Further, this application claims priority from Japanese Patent Application No. 2018-138740 filed on Jul. 24, 2018, the disclosure of which is incorporated herein by reference in its entirety.

BACKGROUND

1. Technical Field

The present disclosure relates to a program for operating a cell culture support apparatus, the cell culture support apparatus, and a method for operating the cell culture support apparatus.

2. Description of the Related Art

Cell culture for culturing cells collected from a living body has been actively performed. In cell culture, first, a basal medium is prepared, and cells are introduced into the basal medium. Then, in order to supplement the amount of consumed by cells, components of the medium are supplied (also referred to as fed) every day.

WO2017/038887A discloses a technique relating to supply of a medium. In paragraph [0293] of WO2017/038887A, a technique for analyzing a relationship between various conditions including culture conditions such as a carbon dioxide concentration, an oxygen concentration, and a temperature, and results of cell culture by a neural network to extract conditions for deriving results, or to predict the results is disclosed.

SUMMARY

The amount of each component in the basal medium and the amount of each component supplied every day have optimum values for obtaining good results. However, in the related art, an operator has no way of knowing the optimum values of the amounts, and relies on his/her own experience. Therefore, a probability of obtaining good results is low. WO2017/038887A does not disclose a solution to such a problem.

An object of the present disclosure is to provide a program for operating a cell culture support apparatus, the cell culture support apparatus, and a method for operating the cell culture support apparatus capable of increasing a probability of obtaining good results in cell culture.

In order to achieve the above object, according to an aspect of the present disclosure, there is provided a program for operating a cell culture support apparatus that causes a computer to function as: a first acquisition unit that acquires a learned model, derived by performing machine learning on the basis of a set of time-series data for learning indicating a time transition of an amount of each of plural types of components constituting a medium used for cell culture and good/bad data indicating good or bad of a result of the cell culture in correspondence with the time-series data for learning, indicating a guideline of the amount; a second acquisition unit that acquires time-series data for analysis indicating the time transition of the amount; a first derivation unit that derives quantitative guideline information of the amount for obtaining a good result in the cell culture, with respect to at least one of the plural types of components, from the learned model acquired in the first acquisition unit and input data of at least a part of the time-series data for analysis acquired in the second acquisition unit; and an output control unit that performs a control for outputting the guideline information.

It is preferable that the first derivation unit derives the guideline information by performing a calculation by substituting the input data into an addition formula in which a basal amount that is an amount in a basal medium prepared prior to start of the cell culture, a supply amount that is an amount supplied every day in a period of the cell culture of a plurality of days, and a metabolic amount that is an amount that cells metabolize are parameters.

It is preferable that the guideline information is information relating to the basal amount or information relating to the supply amount.

It is preferable that the time-series data for learning and the time-series data for analysis include a measurement amount that is an amount measured every day in a period of the cell culture of a plurality of days, and the learned model is an inequality relating to the measurement amount.

It is preferable that the program causing the computer to further function as: a third acquisition unit that acquires a set of the time-series data for learning and the good/bad data; and a second derivation unit that derives the learned model by performing the machine learning on the basis of the set of the time-series data for learning and the good/bad data acquired in the third acquisition unit.

It is preferable that the program causing the computer to further function as: a fourth acquisition unit that acquires data for determination for determining whether a result of the cell culture is good or bad; and a determination unit that determines the good or bad on the basis of the data for determination, wherein the third acquisition unit acquires a determination result of the determination unit as the good/bad data.

It is preferable that the second derivation unit uses a decision tree analysis as a method of the machine learning.

According to another aspect of the present disclosure, there is provided a cell culture support apparatus comprising: a first acquisition unit that acquires a learned model, derived by performing machine learning on the basis of a set of time-series data for learning indicating a time transition of an amount of each of plural types of components constituting a medium used for cell culture and good/bad data indicating good or bad of a result of the cell culture in correspondence with the time-series data for learning, indicating a guideline of the amount; a second acquisition unit that acquires time-series data for analysis indicating the time transition of the amount; a first derivation unit that derives quantitative guideline information of the amount for obtaining a good result in the cell culture, with respect to at least one of the plural types of components, from the learned model acquired in the first acquisition unit and input data of at least a part of the time-series data for analysis acquired in the second acquisition unit; and an output control unit that performs a control for outputting the guideline information.

According to still another aspect of the present disclosure, there is provided a method for operating a cell culture support apparatus, the method comprising: a first acquisition step of acquiring a learned model, derived by performing machine learning on the basis of a set of time-series data for learning indicating a time transition of an amount of each of plural types of components constituting a medium used for cell culture and good/bad data indicating good or bad of a result of the cell culture in correspondence with the time-series data for learning, indicating a guideline of the amount; a second acquisition step of acquiring time-series data for analysis indicating the time transition of the amount; a first derivation step of deriving quantitative guideline informa- tion of the amount for obtaining a good result in the cell culture, with respect to at least one of the plural types of components, from the learned model acquired in the first acquisition step and input data of at least a part of the time-series data for analysis acquired in the second acqui- sition step; and an output control step of performing a control for outputting the guideline information.

Further, according to still another aspect of the present disclosure, there is provided a cell culture support apparatus comprising: a first acquisition processor that acquires a learned model, derived by performing machine learning on the basis of a set of time-series data for learning indicating a time transition of the amount of each of plural types of components constituting a medium used for cell culture and good/bad data indicating good or bad of a result of the cell culture in correspondence with the time-series data for learning, indicating a guideline of the amount; a second acquisition processor that acquires time-series data for analysis indicating the time transition of the amount; a first derivation processor that derives quantitative guideline information of the amount for obtaining a good result in the cell culture, with respect to at least one of the plural types of components, from the learned model acquired in the first acquisition processor and input data of at least a part of the time-series data for analysis acquired in the second acqui- sition processor; and an output control processor that per- forms a control for outputting the guideline information.

According to the present disclosure, it is possible to provide an operating program for a cell culture support apparatus, the cell culture support apparatus, and a method for operating the cell culture support apparatus capable of increasing a probability of obtaining good results in cell culture.

BRIEF DESCRIPTION OF THE DRAWINGS

Exemplary embodiments according to the technique of the present disclosure will be described in detail based on the following figures, wherein:

FIG. 3 is a flowchart showing an overall flow of cell culture;

FIG. 19 is a diagram showing a guideline information display screen in the case of FIG. 16;

DETAILED DESCRIPTION

Figure 1:
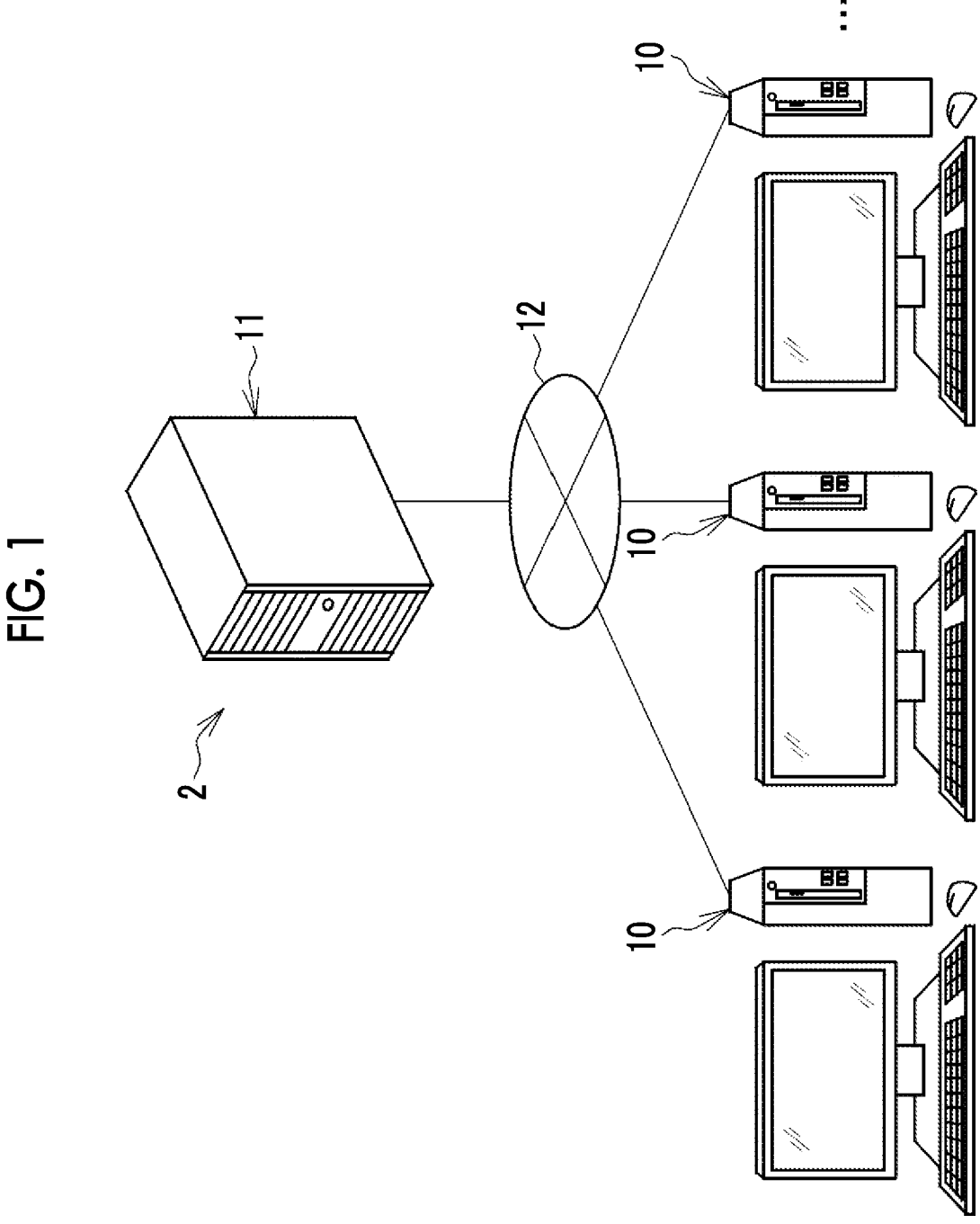
FIG. 1 is a diagram showing a cell culture system.

In FIG. 1, a cell culture system 2 comprises an operator terminal 10 and a cell culture support server 11, and is installed in one medicine development laboratory, for example. The operator terminal 10 is a terminal operated by an operator of cell culture, and is configured by a desktop personal computer, for example. The cell culture support server 11 corresponds to a cell culture support apparatus, and is configured by a server computer. The operator terminal 10 and the cell culture support server 11 are connected to each other through a network 12 such as a local area network (LAN) to communicate with each other.

The operator terminal 10 and the cell culture support server 11 are based on a computer such as a personal computer, a server computer, or a workstation. The operator terminal 10 and the cell culture support server 11 are configured by installing a control program such as an operating system and various application programs on such a computer.

Figure 2:
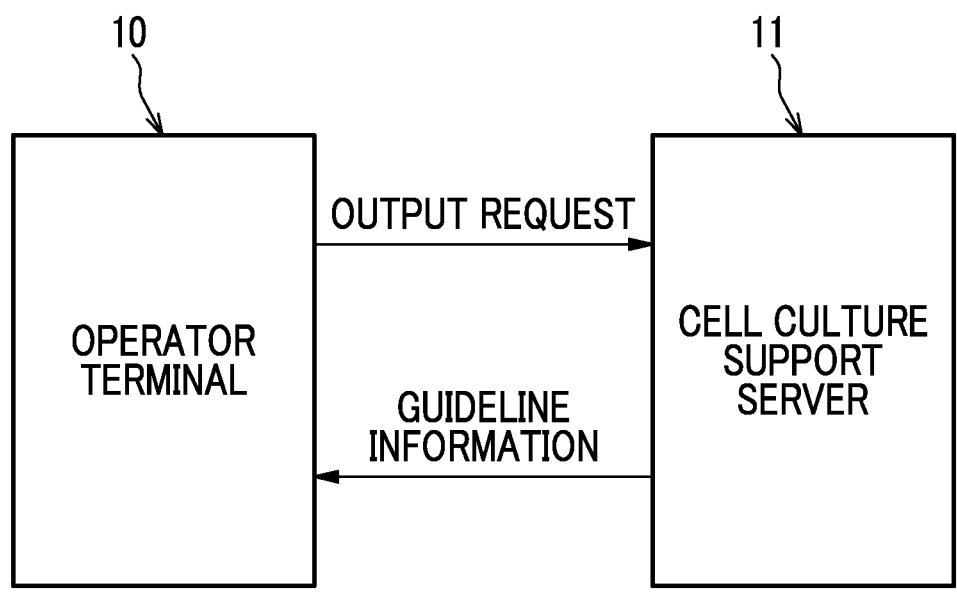
FIG. 2 is a diagram showing a request transmitted from an operator terminal to a cell culture support server and infor- mation transmitted from the cell culture support server to the operator terminal.

In FIG. 2, the operator terminal 10 transmits an output request for guideline information to the cell culture support server 11. The guideline information is quantitative infor- mation on the amounts of components of a medium for obtaining good results in cell culture. The cell culture support server 11 receives the output request, derives the guideline information, and outputs the derived guideline information to the operator terminal 10 that is an output request source.

The cell culture support server 11 generates a guideline information display screen 100 (see FIGS. 17 to 19) that can be viewed on a web browser of the operator terminal 10 as one form of outputting guideline information, and outputs the generated guideline information display screen 100 to the operator terminal 10. More specifically, the cell culture support server 11 outputs the guideline information display screen 100 in the form of screen data for web distribution created in a markup language such as Extensible Markup Language (XML). Instead of XML, another data description language such as JavaScript (registered trademark) Object Notation (JSON) may be used. In addition to the guideline information display screen 100, the cell culture support server 11 outputs various screens to the operator terminal 10 in the form of screen data for web distribution.

FIG. 3 shows an overall flow of culture of cells into which antibody genes are introduced to produce antibodies, for example. First, prior to the start of cell culture, a basal medium is prepared in an incubator 20 (see FIGS. 4 and 5) such as a petri dish or a flask. Then, cells are introduced into the basal medium (Step ST10). As a result, the culture is performed in the incubator 20 (Step ST11). Then, the amounts of plural types of components that form the medium are measured (Step ST12), and then, an operation on the first culture day ends. For example, a liquid chromatograph mass spectrometer is used to measure the amounts. The unit of the amounts is mg, for example. Hereinafter, except for a case where expression of the unit of the amounts is necessary for description, only numerical values will be written without the unit of the amounts.

On the second culture day, in order to supplement the components in a medium consumed by the cells on the first culture day, the components consumed by the cells are supplemented (Step ST13). Then, the culture is performed in the same manner as in the first culture day (Step ST14), and the amounts of the plural types of components that form the medium are measured (Step ST15). On the third culture day and thereafter, the respective steps of supplementing the components of the medium, performing the culture, and measuring the amounts of the components are repeated.

On the last culture day, the respective steps (Step ST19, Step ST20, and step ST21) of supplying the components of the medium, performing the culture, and measuring the amounts of the components are performed in the same manner as in the second culture day, and the like. Finally, antibody concentration is measured (Step ST22), and then, one cell culture is completed. The unit of the antibody concentration is, for example, mg/ml. In the following description, as in the case of the amounts, except for a case where expression of the antibody concentration is necessary for description, the antibody concentration will be written by only its numerical value without its unit.

The operator inputs a basal amount, which is the amount of each component in the basal medium in Step ST10, to the operator terminal 10. Further, the operator inputs a measurement amount, which is the amount of each component measured in Step ST12, Step ST15, Step ST18, . . . , and Step ST21, to the operator terminal 10. Similarly, the operator inputs a supply amount, which is the amount of each component supplied in Step ST13, Step ST16, . . . , and Step ST19, to the operator terminal 10. Further, the operator inputs the antibody concentration measured in Step ST22 to the operator terminal 10. The operator inputs the basal amount, the measurement amount, the supply amount, and the antibody concentration to the operator terminal 10 after the operation of one day is completed. Transitions of the basal amount, the measurement amount, and the supply amount in the respective steps correspond to time-series data indicating time transitions of the respective amounts of the plural types of components that form the medium. The antibody concentration corresponds to data for determination for determining whether the cell culture result is good or bad.

Figure 4:
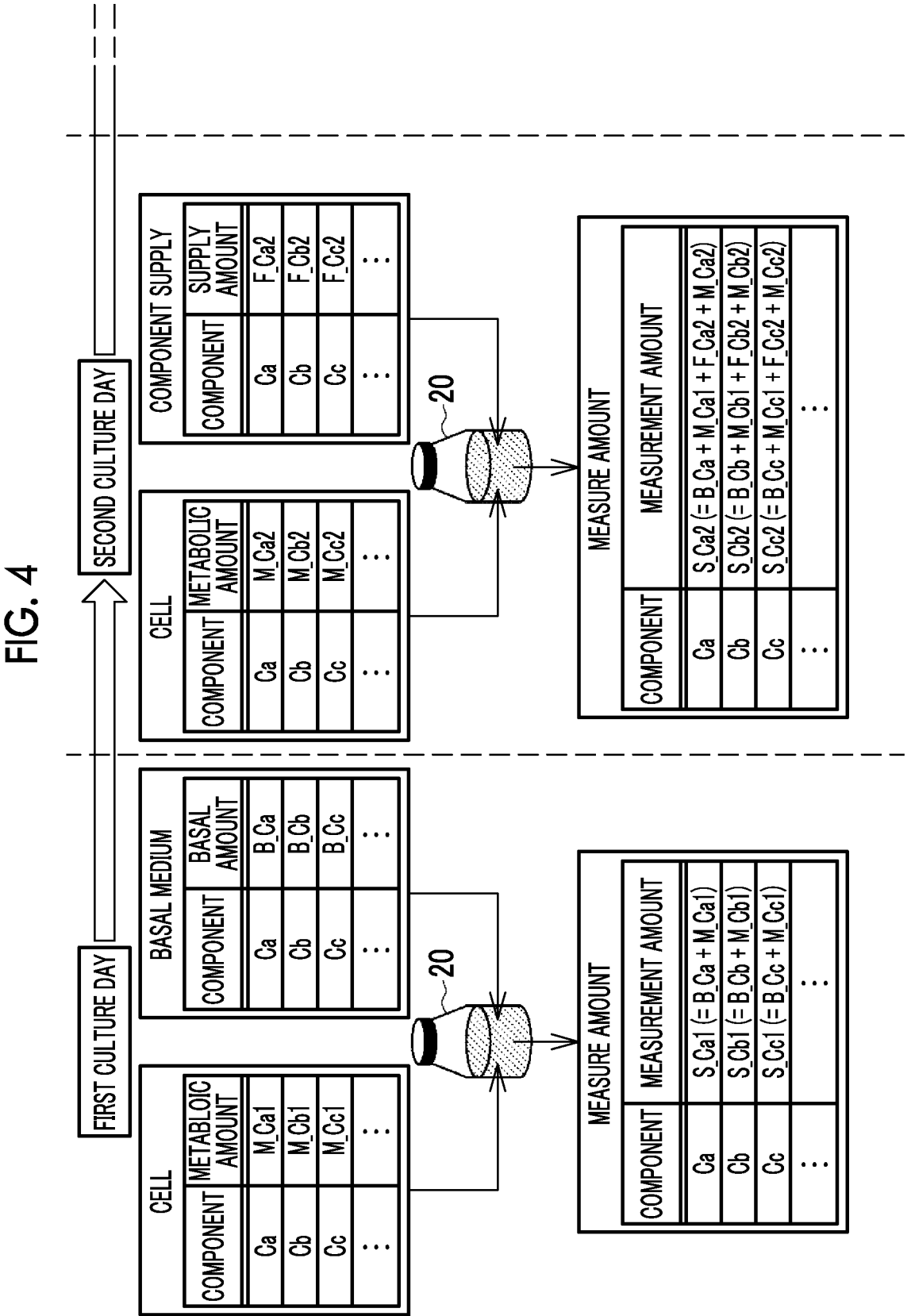
FIG. 4 is a diagram showing a basal amount, a metabolic amount, a measurement amount on a first culture day, a supply amount, a metabolic amount, and a measurement amount on a second culture day.

In FIG. 4, a case where basal amounts of respective components Ca, Cb, Cc, . . . in the basal medium are B_Ca, B_Cb, B_Cc, . . . , and the metabolic amounts that are the amounts of respective components that cells metabolize on the first culture day are M_Ca1, M_Cb1, M_Cc1, . . . will be considered. In this case, a measurement amount S_Ca1 of the component Ca may be expressed by the sum of the basal amount B_Ca and the metabolic amount M_Ca1. That is, S_Ca1=B_Ca+M_Ca1. Similarly, a measurement amount S_Cb1 of the component Cb is expressed by B_Cb+M_Cb1, a measurement amount S_Cc1 of the component Cc is expressed by B_Cc+M_Cc1, and so on.

Next, a case where supply amounts of the respective components on the second culture day are F_Ca2, F_Cb2, F_Cc2, . . . , and metabolic amounts of the respective components on the second culture day are M_Ca2, M_Cb2, M_Cc2, . . . will be considered. In this case, the measurement amount S_Ca2 of the component Ca on the second culture day may be expressed by the sum of the basal amount B_Ca, the metabolic amounts M_Ca1 and M_Ca2, and the supply amount F_Ca2. That is, S_Ca2=B_Ca+ M_Ca1+F_Ca2+M_Ca2. Similarly, a measurement amount S_Cb2 of the component Cb on the second culture day may be expressed by B_Cb+M_Cb1+F_Cb2+M_Cb2, and a measurement amount S_Cc2 of the component Cc on the second culture day may be expressed by B_Cc+M_Cc1+ F_Cc2+M_Cc2, and so on.

Figure 5:
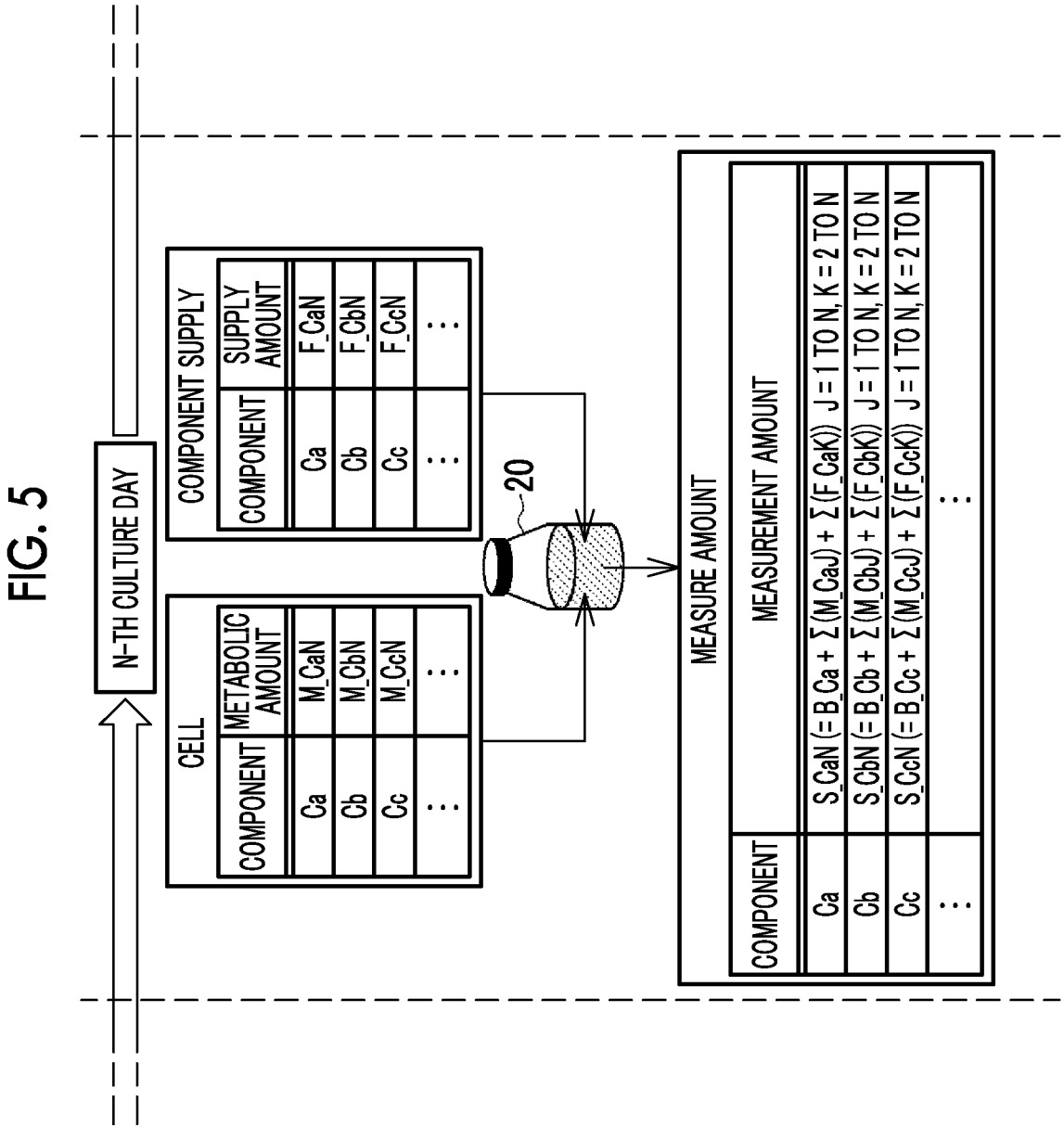
FIG. 5 is a diagram showing a supply amount, a metabolic amount, and a measurement amount on a N-th culture day.

From the above description, the measurement amounts S_CaN, S_CbN, S_CcN, . . . of the respective components on the N-th culture day (N is a natural number of 2 or greater) may be expressed as shown in FIG. 5. That is, in a case where the supply amounts of the respective components on the N-th culture day are F_CaN, F_CbN, F_CcN, . . . , and the metabolic amounts of the respective components on the N-th culture day are M_CaN, M_CbN, M_CcN, . . . , the measurement amount S_CaN of the component Ca on the N-th culture day is expressed by B_Ca+Σ(M_CaJ)+Σ (F_CaK), the measurement amount S_CbN of the component Cb on the N-th culture day is expressed by B_Cb+Σ (M_CbJ)+Σ(F_CbK), and the measurement amount S_CcN of component Cc on the N-th culture day is expressed by B_Cc+Σ(M_CcJ)+Σ(F_CcK), and so on. Here, J=1 to N, and K=2 to N.

As described above, the measurement amount of each component may be expressed by an addition formula in which the basal amount, the supply amount, and the metabolic amount are parameters. The components are, for example, glutamine, histidine, asparagine, leucine, phenylalanine, tryptophan, serine, yeast extract, sodium chloride, potassium nitrate, lactose, and the like. The metabolic amount takes a positive value in a case where a cell produces its component, and takes a negative value in a case where the cell consumes the component.

Figure 6:
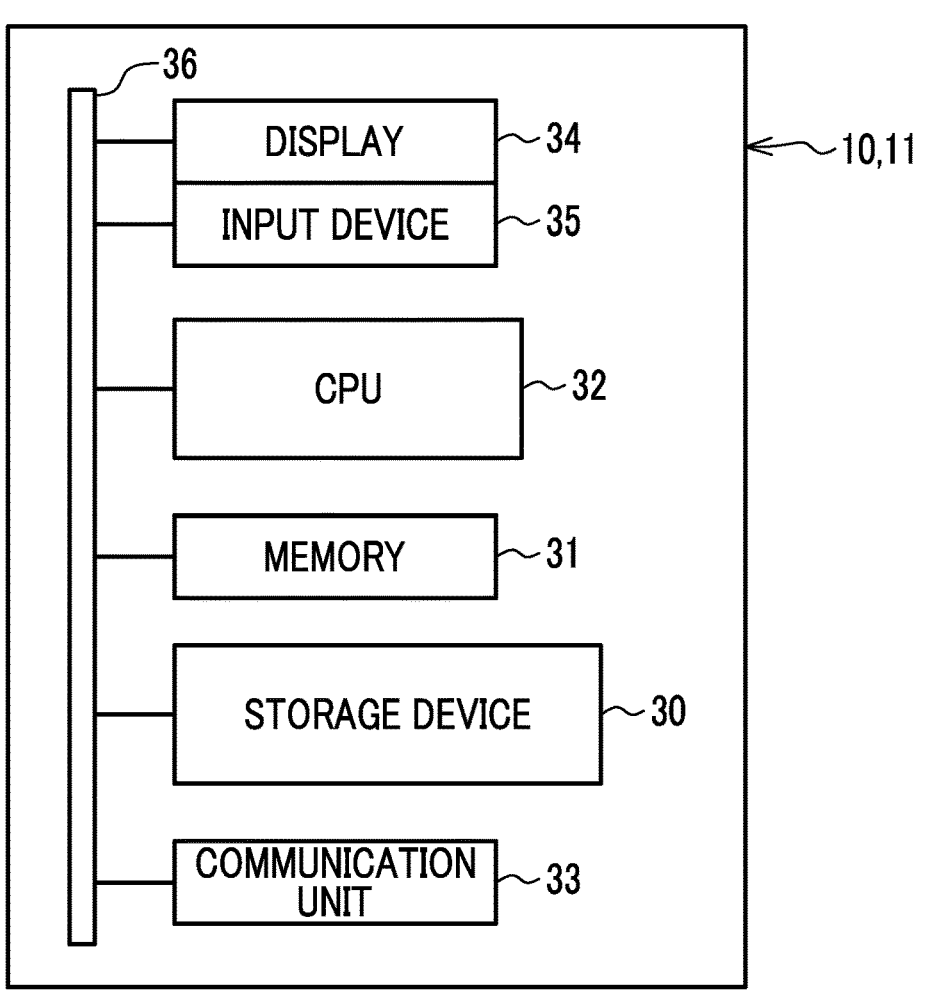
FIG. 6 is a block diagram showing a computer that configures the operator terminal and the cell culture support server.

In FIG. 6, the computers that constitute the operator terminal 10 and the cell culture support server 11 have the same basic configuration, and each computer comprises a storage device 30, a memory 31, a central processing unit (CPU) 32, a communication unit 33, a display 34, and an input device 35, respectively. These components are connected to each other through a data bus 36.

The storage device 30 is a hard disk drive that is built in the computer that constitutes the operator terminal 10 or the like or is connected to the computer through a cable or a network. Alternatively, the storage device 30 is a disk array in which a plurality of hard disk drives are connected in series. The storage device 30 stores a control program such as an operating system, various application programs, various types of data associated with these programs, and the like.

The memory 31 is a work memory used when the CPU 32 executes processing. The CPU 32 loads the program stored in the storage device 30 into the memory 31, and executes processing according to the program, thereby comprehensively controlling the respective units of the computer.

The communication unit 33 is a network interface that performs a transmission control of various types of information through the network 12. The display 34 displays various screens. Various screens are provided with an operation function by Graphical User Interface (GUI). The computer that constitutes the operator terminal 10 or the like receives an input of an operation command through the input device 35 on the various screens. The input device 35 is a keyboard, a mouse, a touch panel, or the like.

In the following description, a suffix "A" is assigned to each unit of the computer that configures the operator terminal 10, and a suffix "B" is assigned to each unit of the computer that configures the cell culture support server 11, respectively.

Figure 7:
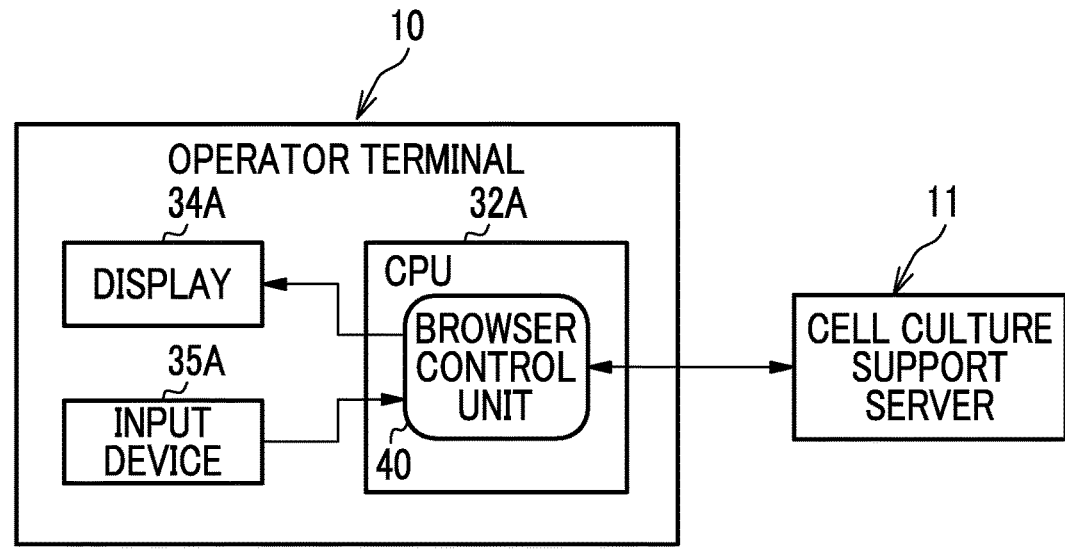
FIG. 7 is a block diagram showing a processing unit of a CPU of the operator terminal.

In FIG. 7, in a case where a web browser is activated, the CPU 32A of the operator terminal 10 functions as a browser control unit 40 in cooperation with the memory 31 and the like. The browser control unit 40 controls an operation of the web browser. The browser control unit 40 receives screen data of various screens from the cell culture support server 11. The browser control unit 40 reproduces the various screens displayed on the web browser on the basis of the screen data, and displays the various screens on a display 34A.

The browser control unit 40 also receives various operation commands input through the input device 35A on the various screens. The browser control unit 40 issues various requests corresponding to the various operation commands to the cell culture support server 11. The operation commands include a guideline information output command. In a case where the guideline information output command is received, the browser control unit 40 issues an output request for guideline information to the cell culture support server 11.

Figure 8:
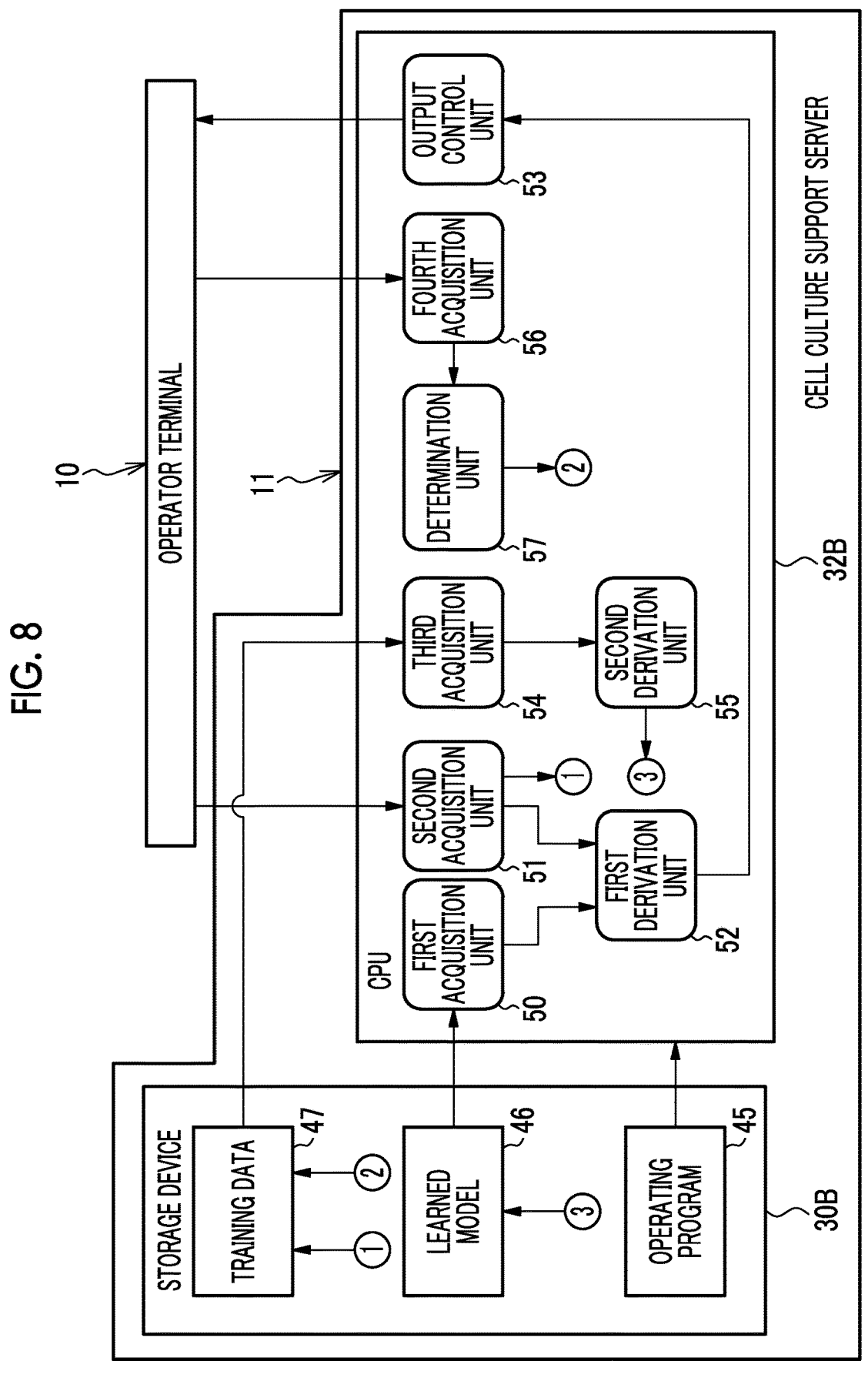
FIG. 8 is a block diagram showing a processing unit of a CPU of the cell culture support server.

In FIG. 8, a storage device 30B of the cell culture support server 11 stores an operating program 45 that is an application program. The operating program 45 is an application program for causing the computer that constitutes the cell culture support server 11 to function as a cell culture support apparatus. That is, the operating program 45 is an example of a "program for operating the cell culture support apparatus" according to the technique of the present disclosure. The storage device 30B stores a learned model 46 and training data 47 in addition to the operating program 45.

In a case where the operating program 45 is activated, the CPU 32B of the cell culture support server 11 functions as a first acquisition unit 50, a second acquisition unit 51, a first derivation unit 52, an output control unit 53, a third acquisition unit 54, a second derivation unit 55, a fourth acquisition unit 56, and a determination unit 57 in cooperation with the memory 31 and the like.

In an operating phase of machine learning, the first acquisition unit 50 reads out the learned model 46 from the storage device 30B to acquire the learned model 46. The first acquisition unit 50 outputs the acquired learned model 46 to the first derivation unit 52.

The second acquisition unit 51 acquires time-series data indicating time transitions of respective amounts of plural types of components that form a culture medium. The second acquisition unit 51 registers the acquired time-series data as the training data 47 in the storage device 30B, and outputs the result to the first derivation unit 52. The time-series data registered as the training data 47 is time-series data for learning. On the other hand, the time-series data output to the first derivation unit 52 is time-series data for analysis that the first derivation unit 52 analyzes using the learned model 46.

In the operating phase, the first derivation unit 52 derives guideline information, with respect to at least one of the plural types of components, from the learned model 46 acquired in the first acquisition unit 50 and input data of at least a part of the time-series data for analysis acquired in the second acquisition unit 51. The first derivation unit 52 outputs the derived guideline information to the output control unit 53.

In the operating phase, the first derivation unit 52 retrieves whether there is data that serves as input data in the time-series data for analysis. The input data is data that the first derivation unit 52 can combine with the learned model 46 to be substituted into the addition formula in order to derive the guideline information. The first derivation unit 52 derives the guideline information in a case where there is the data that serves as the input data in the time-series data for analysis. On the other hand, in a case where there is no data that serves as the input data in the time-series data for analysis, the first derivation unit 52 does not derive the guideline information.

The input data is, for example, a basal amount of a certain first component, a measurement amount of the certain component on the second culture day, a supply amount of the certain component on the third culture day, or the like. In addition, the input data is, for example, a combination of supply amounts of certain two components on the fourth culture day, a combination of a basal amount and a measurement amount of a certain component on the first culture day, or the like. As described above, the input data is at least a part of the time-series data for analysis acquired by the second acquisition unit 51.

In the operating phase, the output control unit 53 performs a control for outputting the guideline information derived by the first derivation unit 52. More specifically, the output control unit 53 generates screen data of the guideline information display screen 100 for web distribution. Then, the generated screen data of the guideline information display screen 100 is output to the operator terminal 10 that is an output request source. The output control unit 53 generates screen data of various screens other than the guideline information display screen 100, and outputs the result to the operator terminal 10.

In the learning phase of machine learning, the third acquisition unit 54 reads out the training data 47 from the storage device 30B to acquire the training data 47. The training data 47 includes a set of time-series data for learning and good/bad data indicating good or bad results of cell culture (see FIG. 10). That is, the third acquisition unit 54 acquires the training data 47 to acquire the set of the time-series data for learning and the good/bad data. The third acquisition unit 54 outputs the acquired training data 47 to the second derivation unit 55.

In the learning phase, the second derivation unit 55 performs machine learning on the basis of the training data 47 which is acquired by the third acquisition unit 54, and derives the learned model 46 indicating a guideline for amounts. The second derivation unit 55 registers the derived learned model 46 in the storage device 30B.

The acquisition of the training data 47 in the third acquisition unit 54 and the derivation of the learned model 46 in the second derivation unit 55 are performed at preset timings such as every month. Of course, the acquisition of the training data 47 in the third acquisition unit 54 and the derivation of the learned model 46 in the second derivation unit 55 may be performed at timings commanded by the operator.

Further, the acquisition of the training data 47 in the third acquisition unit 54 and the derivation of the learned model 46 in the second derivation unit 55 are not performed while the number of samples of the training data 47 is smaller than a set value. In other words, the learned model 46 is derived by the second derivation unit 55 only in a case where the number of samples of the training data 47 is equal to or larger than the set value. The number of samples of the training data 47 is the number of records shown in FIG. 10.

The fourth acquisition unit 56 acquires data for determination from the operator terminal 10. The fourth acquisition unit 56 outputs the acquired data for determination to the determination unit 57. The data for determination refers to the antibody concentration as shown in FIG. 3, in this example.

The determination unit 57 determines whether a cell culture result is good or bad on the basis of the data for determination from the fourth acquisition unit 56. Specifically, the data for determination and a preset determination condition are compared with each other. Then, in a case where the data for determination satisfies the determination condition, it is determined that the cell culture result is good, and conversely, in a case where the data for determination does not satisfy the determination condition, it is determined that the cell culture result is bad. The determination unit 57 registers the determination result of good or bad in the training data 47 of the storage device 30B as good/bad data. As described above, since the determination result of the determination unit 57 is registered in the training data 47 as good or bad data and the third acquisition unit 54 acquires the training data 47, the third acquisition unit 54 acquires the determination result of the determination unit 57 as good/bad data.

Figure 9:
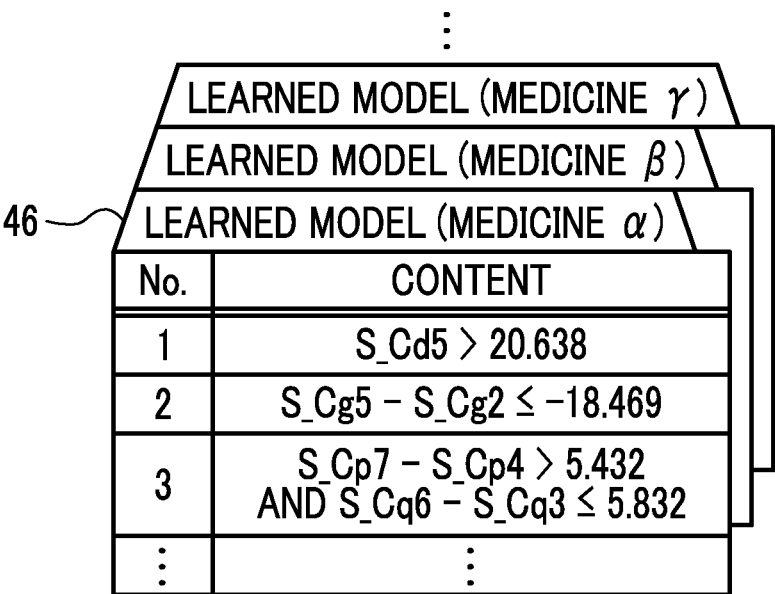
FIG. 9 is a diagram showing the content of a learned model.

In FIG. 9, the learned model 46 is derived for each culture purpose such as for medicine α or medicine β.

In FIG. 9, the learned model 46 for the medicine α is shown. For example, the learned model 46 of No. 1 has S_Cd5>20.638. This learned model 46 shows that it is possible to obtain a good result in cell culture in a case where a measurement amount of a component Cd on the fifth culture day is greater than 20.638. In addition, the second learned model 46 of No. 2 has S_Cg5-S_Cg2≤−18.469. The learned model 46 shows that it is possible to obtain a good result in cell culture in a case where a difference between a measurement amount of a component Cg on the fifth culture day and a measurement amount thereof on the second culture day (hereinafter, the difference is referred to as a day difference) is equal to or less than −18.469. Further, the learned model 46 of No. 3 has S_Cp7-S_Cp4>5.432 and S_Cq6-S_Cq3≤5.832. This learned model 46 shows that it is possible to obtain a good result in cell culture in a case where a day difference of a component Cp between the seventh culture day and the fourth culture day is larger than 5.432 and a day difference of a component Cq between the sixth culture day and the third culture day is equal to or less than 5.832. As described above, the learned model 46 is an inequality relating to the measurement amounts.

Figure 10:
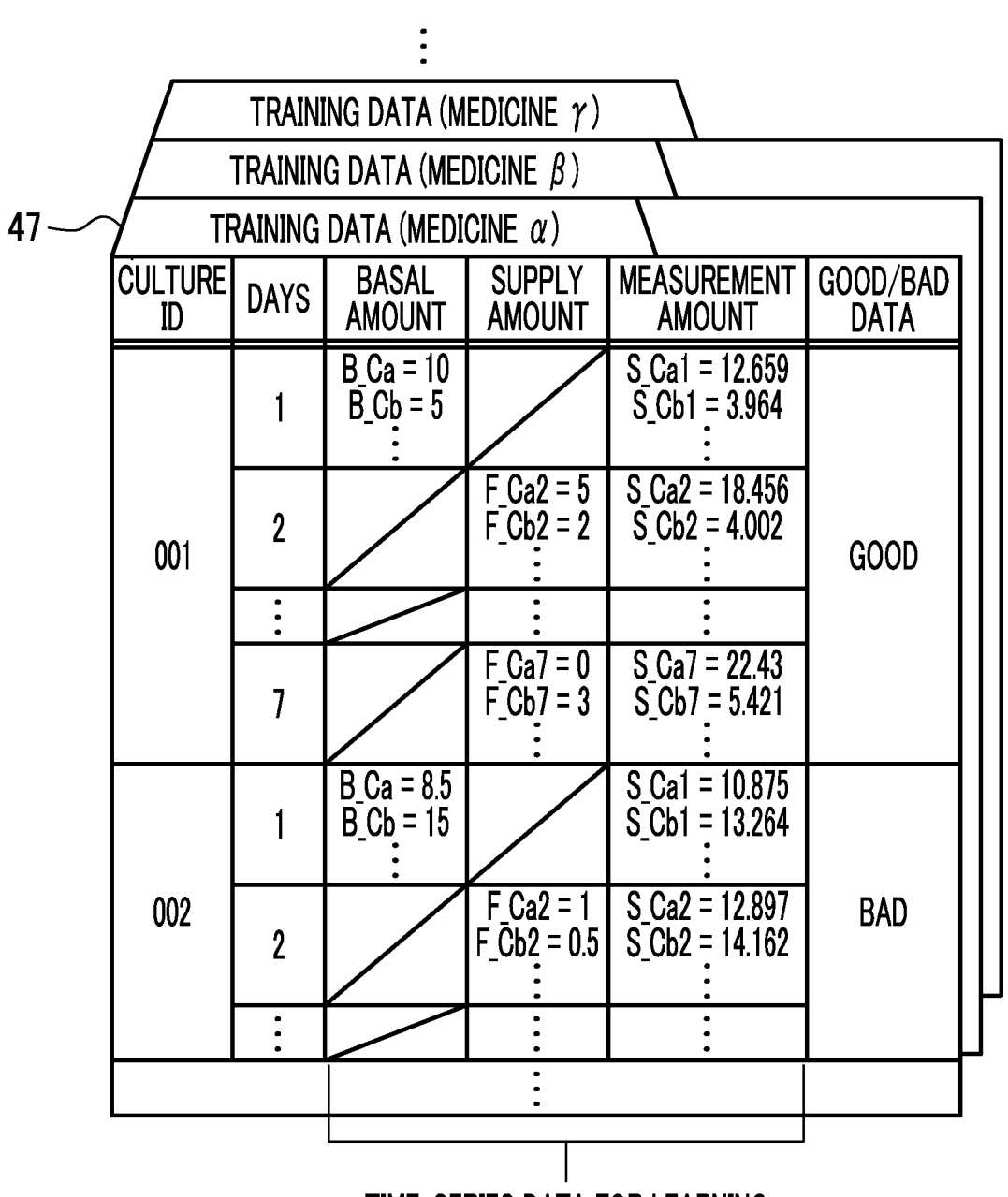
FIG. 10 is a diagram showing the content of training data.

In FIG. 10, the training data 47 is also registered for each culture purpose like the learned model 46. In the training data 47, an area separated by a culture ID that is assigned to each cell culture forms one record. Further, each record is separated by the number of days of culture. A basal amount and a measurement amount are registered on the first culture day (the number of days is 1), and the measurement amount and the supply amount instead of the basal amount are registered on the second culture day (the number of days is 2) and thereafter, respectively. Furthermore, good/bad data is registered in each record. That is, the training data 47 is configured of a set of time-series data for learning and good/bad data corresponding thereto. Note that FIG. 10 shows the training data 47 for the medicine α same as in FIG. 9.

Figure 11:
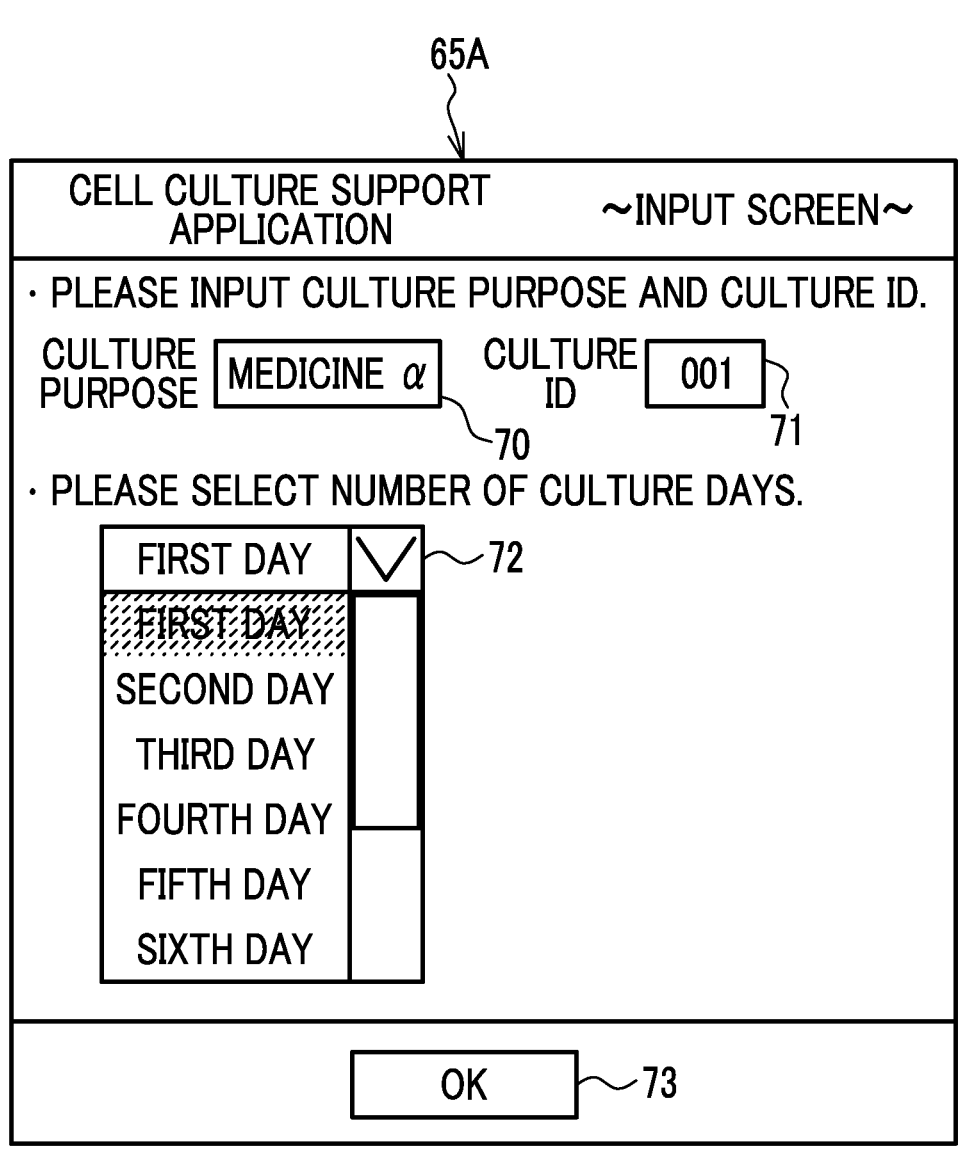
FIG. 11 is a diagram showing an input screen for a culture purpose, a culture ID, and the number of culture days.
Figure 12:
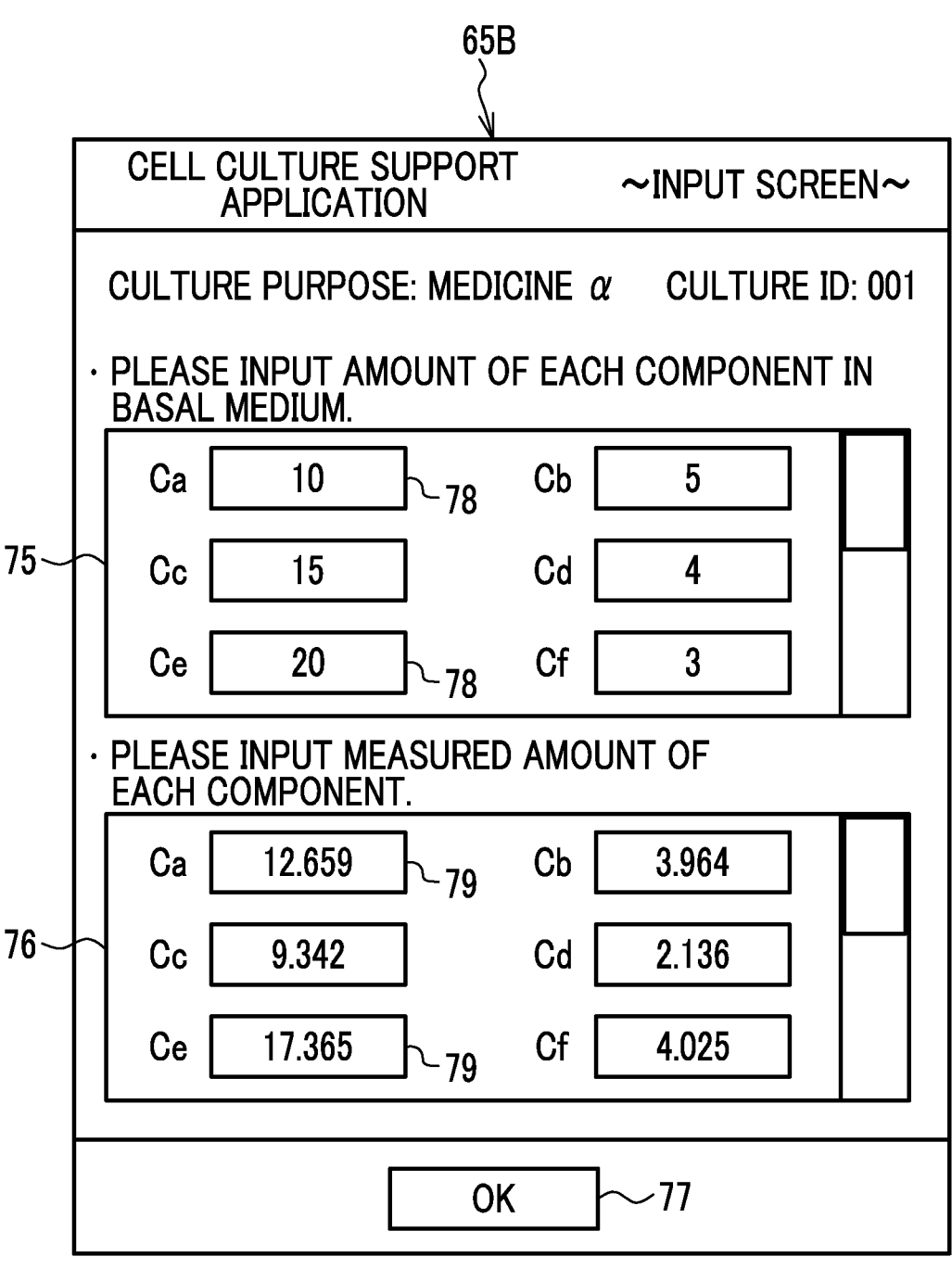
FIG. 12 is a diagram showing an input screen for a basal amount and a measurement amount.
Figure 13:
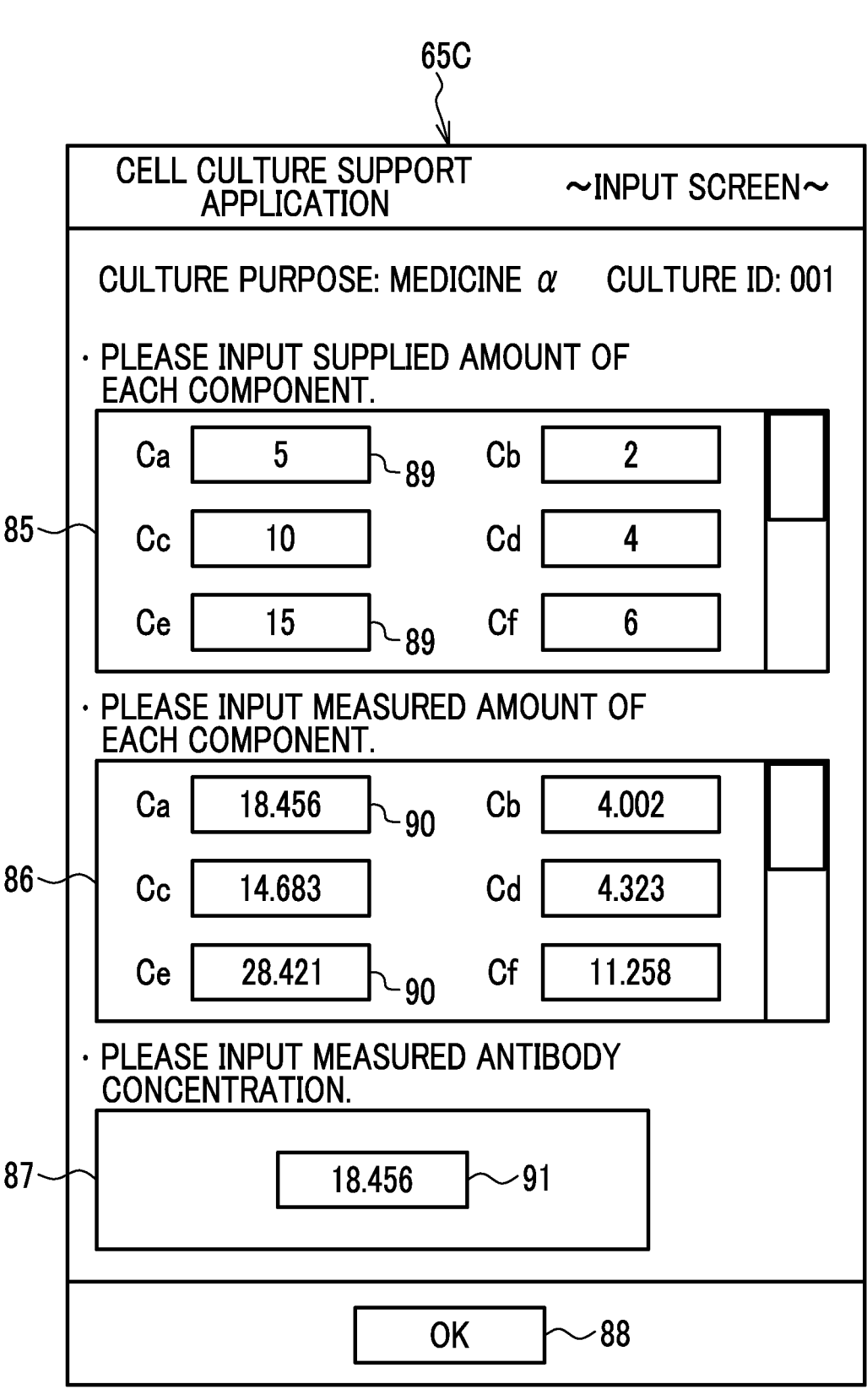
FIG. 13 is a diagram showing an input screen for a supply amount, a measurement amount, and an antibody concen- tration.

FIGS. 11 to 13 are examples of input screens displayed on the display 34A of the operator terminal 10. A first input screen 65A shown in FIG. 11, a second input screen 65B shown in FIG. 12, and a third input screen 65C shown in FIG. 13 are generated in the output control unit 53 of the cell culture support server 11, and are output to the operator terminal 10. Then, the first to third input screens 65A, 65B and 65C are displayed on the display 34A by the browser control unit 40 of the operator terminal 10.

The first input screen 65A shown in FIG. 11 is a screen for inputting a culture purpose, a culture ID, and the number of culture days. An input box 70 for the culture purpose, an input box 71 for the culture ID, a pull-down menu 72 for selecting the number of culture days, and an OK button 73 are provided on the first input screen 65A.

The culture purpose is input to the input box 70, the culture ID is input to the input box 71, the first culture day is selected from the pull-down menu 72, and then, the OK button 73 is selected. In this case, the display is switched to the second input screen 65B shown in FIG. 12. On the other hand, in a case where the second culture day or thereafter is selected from the pull-down menu 72 and the OK button 73 is selected, the display is switched to the third input screen 65C shown in FIG. 13.

The second input screen 65B shown in FIG. 12 is a screen for inputting the basal amount and the measurement amount. A first area 75, a second area 76, and an OK button 77 are provided on the second input screen 65B. An input box 78 for the basal amount of each component is provided in the first area 75, and an input box 79 for the measurement amount of each component on the first culture day is provided in the second area 76.

The basal amount is input to the input box 78, the measurement amount on the first culture day is input to the input box 79, and then, the OK button 77 is selected. In this case, the browser control unit 40 issues an output request for guideline information to the cell culture support server 11. That is, the selection of the OK button 77 corresponds to an output command of guideline information.

The guideline information output request in this case includes the basal amount input to the input box 78 and the measurement amount on the first culture day input to the input box 79. Further, the guideline information output request in this case also serves as a registration request for registering the basal amount input to the input box 78 and the measurement amount on the first culture day input to the input box 79, as the training data 47.

The third input screen 65C shown in FIG. 13 is a screen for inputting a supply amount, a measurement amount, and an antibody concentration. A first area 85, a second area 86, a third area 87, and an OK button 88 are provided on the third input screen 65C. An input box 89 for the supply amount of each component is provided in the first area 85, an input box 90 of the measurement amount of each component is provided in the second area 86, and an input box 91 for the antibody concentration is provided in the third area 87.

The supply amount is input to the input box 89, the measurement amount is input to the input box 90, the antibody concentration is input to the input box 91 on the last culture day, and then, the OK button 88 is selected. In this case, similarly to the case of the input screen 65B in FIG. 12, the browser control unit 40 issues an output request for guideline information to the cell culture support server 11.

The guideline information output request in this case includes the supply amount input to the input box 89 and the measurement amount input to the input box 90. On the last culture day, the guideline information output request also includes the antibody concentration input to the input box 91. Further, similarly to the case of the input screen 65B in FIG. 12, the guideline information output request in this case also serves as a registration request for registering the supply amount input to the input box 89 and the measurement amount input to the input box 90, as the training data 47. On the last culture day, the guideline information output request in this case also serves as a registration request for registering good/bad data determined on the basis of the antibody concentration input to the input box 91, as the training data 47.

Figure 14:
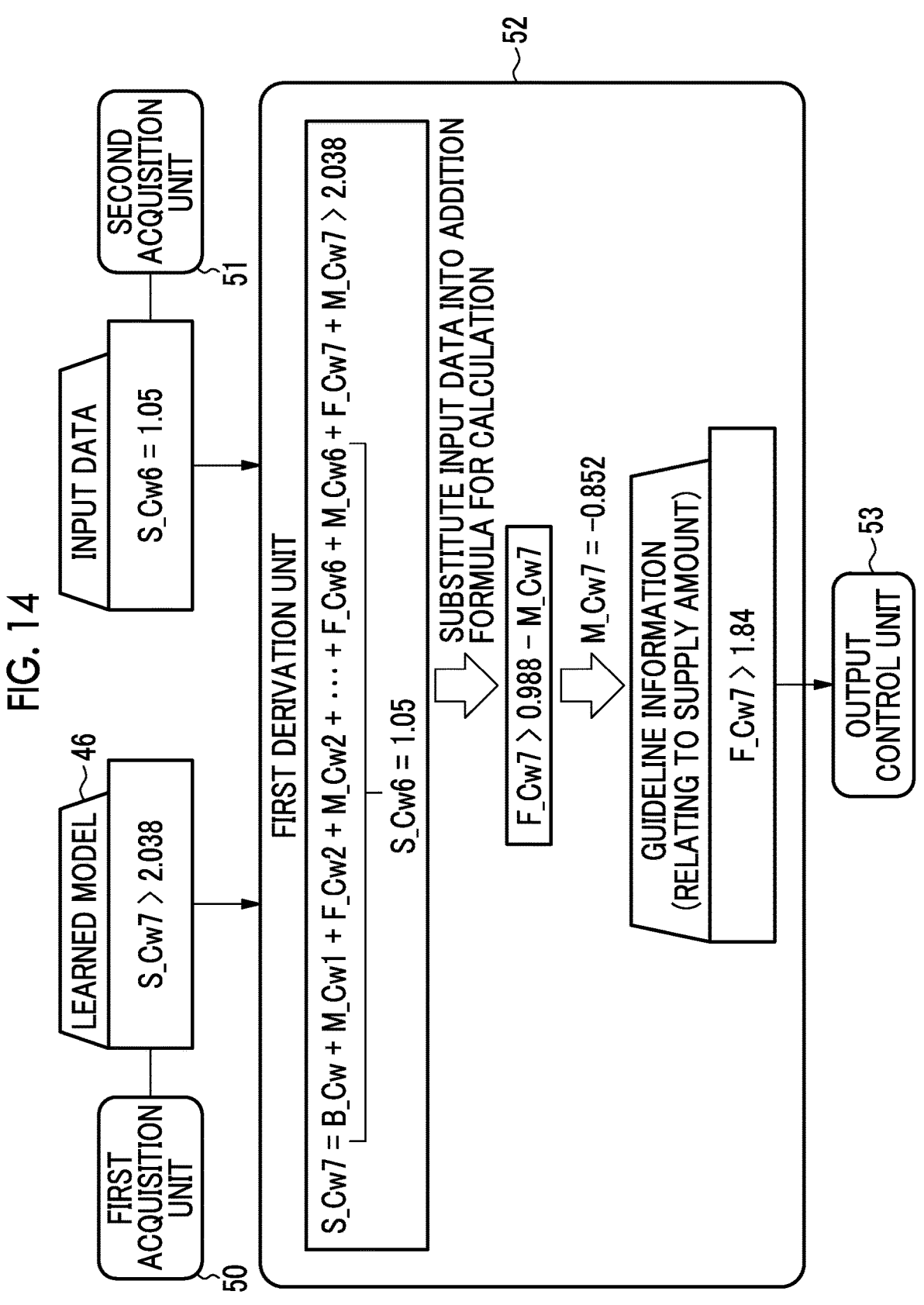
FIG. 14 is a diagram showing a guideline information deriving process in a first derivation unit.
Figure 15:
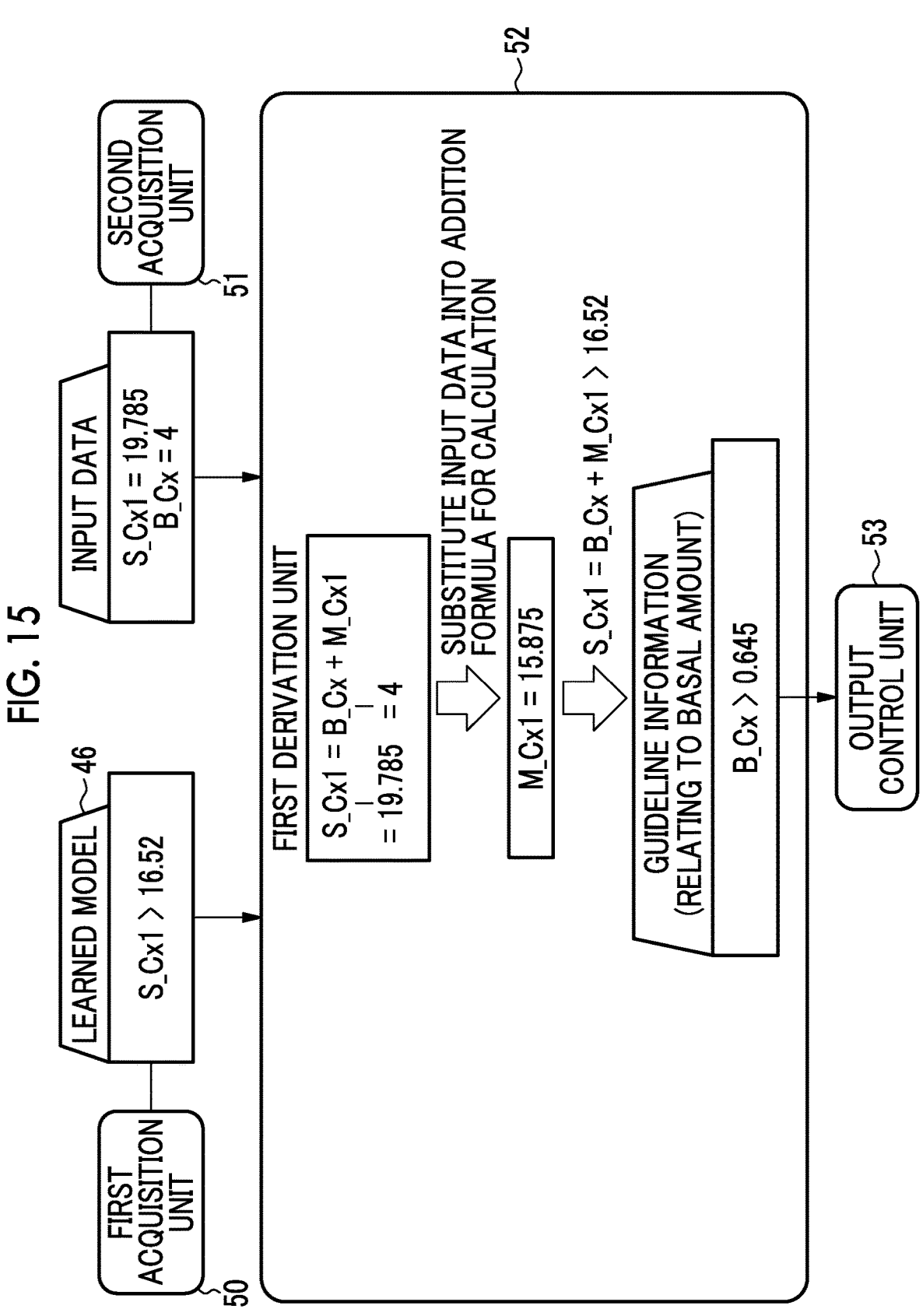
FIG. 15 is a diagram showing a guideline information deriving process in the first derivation unit.
Figure 16:
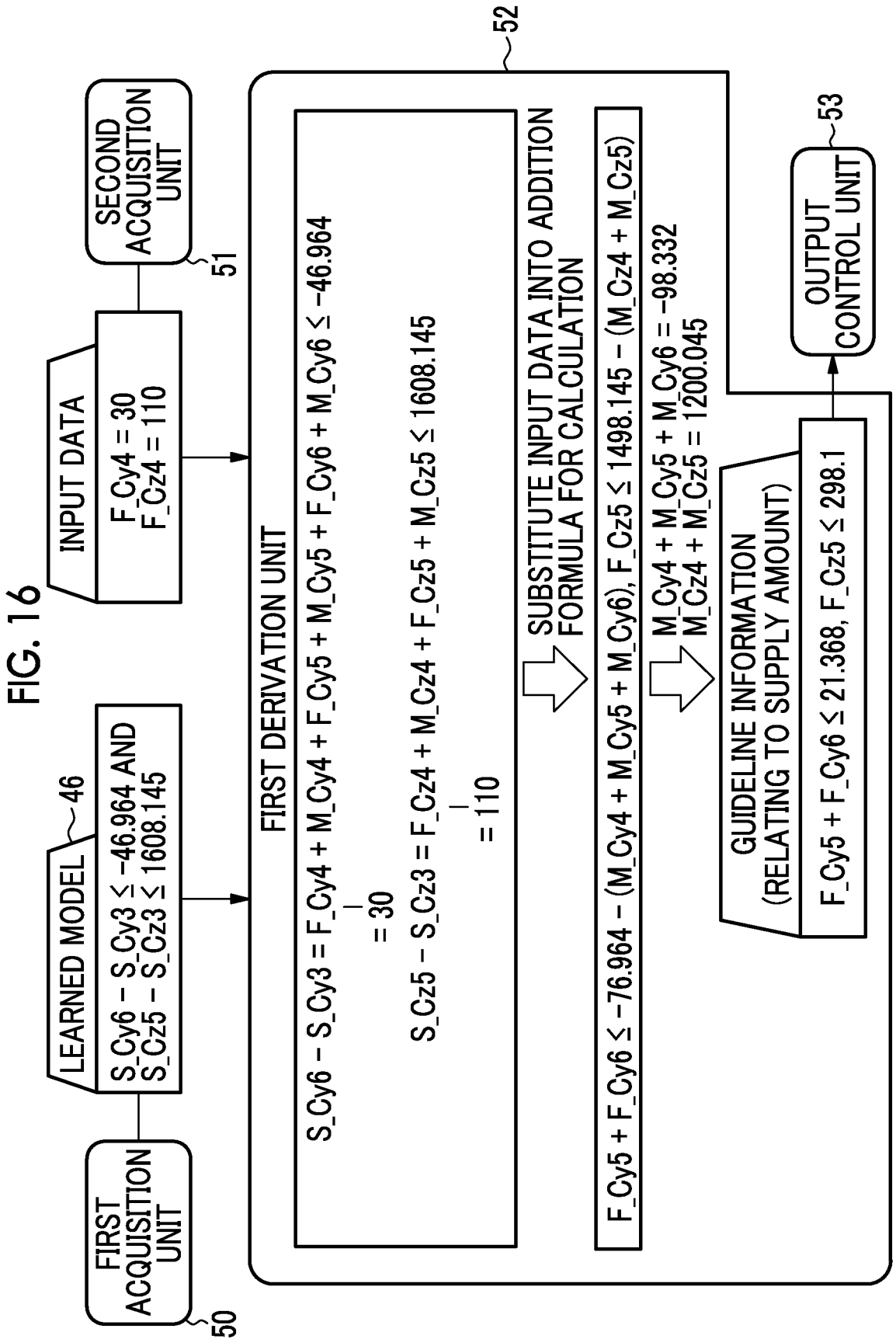
FIG. 16 is a diagram showing a guideline information deriving process in the first derivation unit.

FIGS. 14 to 16 are diagrams showing a guideline information deriving process in the first derivation unit 52.

FIG. 14 shows a case where the learned model 46 from the first acquisition unit 50 has a content of S_Cw7>2.038. Further, FIG. 14 shows a case where the time-series data for analysis from the second acquisition unit 51 is input data on the sixth culture day and S_Cw6=1.05 is retrieved as the input data. In this case, the first derivation unit 52 substitutes S_Cw6=1.05 that is the input data into the addition formula indicating S_Cw7 for calculation. More specifically, 1.05 is substituted for B_Cw+M_Cw1+F_Cw2+M_Cw2+ . . . +F_Cw6+M_Cw6, which is a part corresponding to S_Cw6 in the addition formula indicating S_Cw7, and the inequality S_Cw7>2.038 is calculated for F_Cw7. As a result, Formula (1) is obtained.

$$F\_Cw7>0.988-M\_Cw7 \tag{1}$$

The first derivation unit 52 further substitutes M_Cw7=−0.852 into Formula (1) to obtain Formula (2).

$$F\_Cw7>1.84 \tag{2}$$

The first derivation unit 52 outputs Formula (2) to the output control unit 53 as guideline information.

The value of M_Cw7 to be substituted into Formula (1) is a value obtained by subtracting the measurement amount S_Cw6 on the sixth culture day and the supply amount F_Cw7 on the seventh culture day from the measurement amount S_Cw7 on the seventh culture day in the training data 47. More specifically, the first derivation unit 52 performs the above subtraction for each record of the training data 47 to calculate the value of M_Cw7 for each record.

Then, an average value of M_Cw7 calculated for each record is calculated to obtain the value of M_Cw7 to be substituted into Formula (1).

The guideline information of Formula (2) shows that in a case where the supply amount of the component Cw on the seventh culture day is larger than 1.84, a good result can be obtained in cell culture. That is, the guideline information of Formula (2) is information relating to the supply amount.

FIG. 15 shows a case where the learned model 46 from the first acquisition unit 50 has a content of S_Cx1>16.52. Further, FIG. 15 shows a case where the time-series data for analysis from the second acquisition unit 51 is input data on the first culture day and S_Cx1=19.785 and B_Cx=4 are retrieved as the input data. In this case, the first derivation unit 52 substitutes the input data S_Cx1=19.785 and B_Cx=4 into the addition formula (S_Cx1=B_Cx+M_Cx1) indicating S_Cx1 for calculation. As a result, Formula (3) is obtained.

$$M\_Cx1=15.875 \tag{3}$$

The first derivation unit 52 substitutes Formula (3) into the inequality of S_Cx1=B_Cx+M_Cx1>16.52 that is the learned model 46 to obtain Formula (4).

$$B\_Cx>0.645 \tag{4}$$

The first derivation unit 52 outputs Formula (4) to the output control unit 53 as guideline information.

The guideline information of Formula (4) shows that in a case where the basal amount of the component Cx is larger than 0.645, a good result can be obtained in cell culture. That is, the guideline information of Formula (4) is information relating to the basal amount.

FIG. 16 shows a case where the learned model 46 from the first acquisition unit 50 has a content of S_Cy6-S_Cy3≤−46.964 and S_Cz5-S_Cz3≤1608.145. Further, FIG. 16 shows a case where the time-series data for analysis from the second acquisition unit 51 is input data on the fourth culture day and F_Cy4=30 and F_Cz=110 are extracted as the input data. In this case, the first derivation unit 52 substitutes F_Cy4=30 that is the input data into the addition formula indicating S_Cy6-S_Cy3, and F_Cz4=110 that is the input data into the addition formula indicating S_Cz5-S_Cz3, for calculation. As a result, Formulas (5) and (6) are obtained.

$$F\_Cy5+F\_Cy6≤-76.964-(M\_Cy4+M\_Cy5+M\_Cy6) \tag{5}$$

$$F\_Cz5≤1498.145-(M\_Cz4+M\_Cz5) \tag{6}$$

The first derivation unit 52 further substitutes M_Cy4+M_Cy5+M_Cy6=−98.332 into Formula (5) to obtain Formula (7). Further, the first derivation unit 52 further substitutes M_Cz4+M_Cz5=1200.045 into Formula (6) to obtain Formula (8).

$$F\_Cy5+F\_Cy6≤21.368 \tag{7}$$

$$F\_Cz5≤298.1 \tag{8}$$

The first derivation unit 52 outputs Formulas (7) and (8) to the output control unit 53 as guideline information. The value of M_Cy4+M_Cy5+M_Cy6 to be substituted into Formula (5) and the value of M_Cz4+M_Cz5 to be substituted into Formula (6) may be obtained from the training data 47, similarly to the case of the value of M_Cw7 in FIG. 14.

The guideline information of Formula (7) shows that in a case where a sum of the supply amounts of the component Cy on the fifth culture day and the sixth culture day is equal to or less than 21.368, a good result can be obtained in cell culture. Further, the guideline information of Formula (8)

shows that in a case where the supply amount of the component Cz on the fifth culture day is equal to or less than 298.1, a good result can be obtained in cell culture. That is, the guideline information of Formulas (7) and (8) is information relating to the supply amount, similarly to the guideline information of Formula (2) in FIG. 14.

Figure 17:
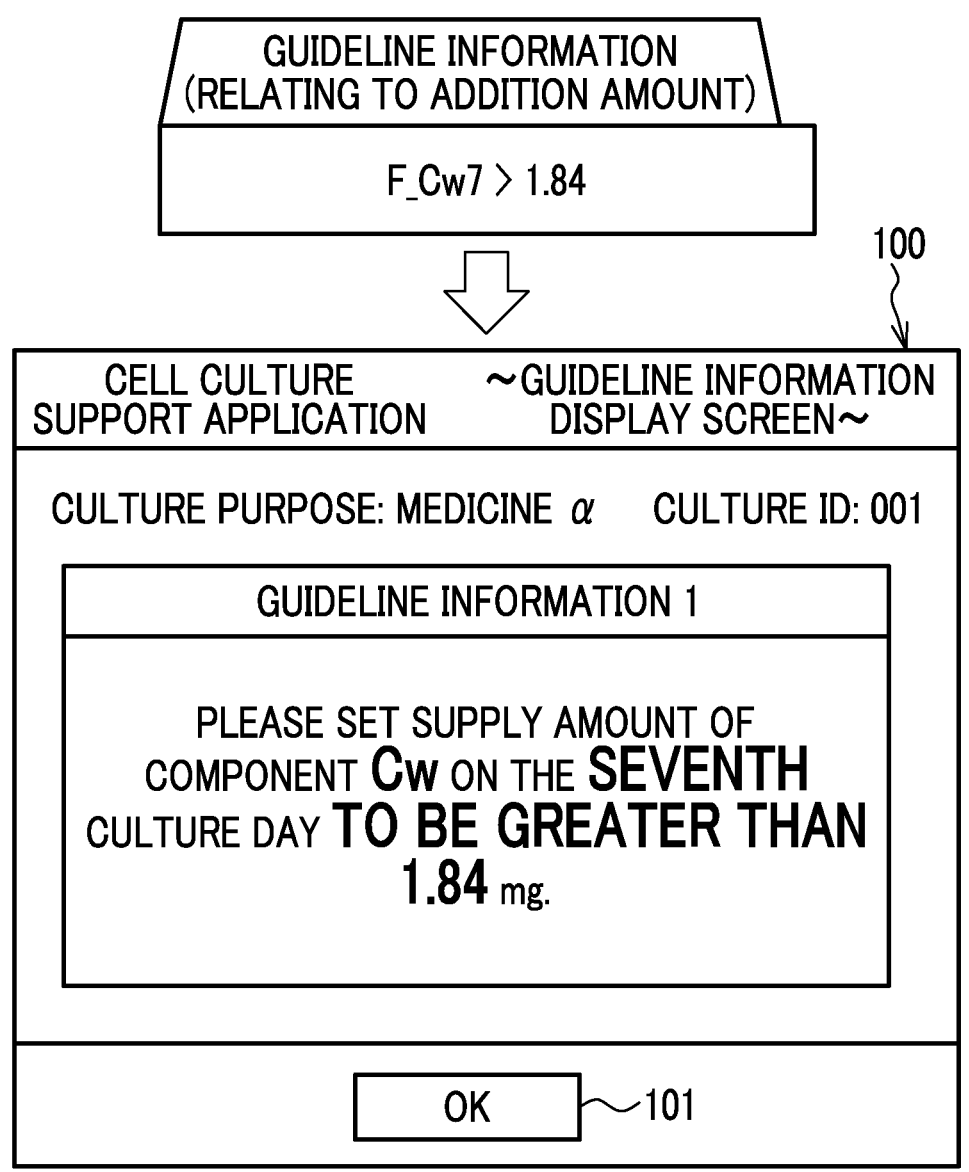
FIG. 17 is a diagram showing a guideline information display screen in the case of FIG. 14.
Figure 18:
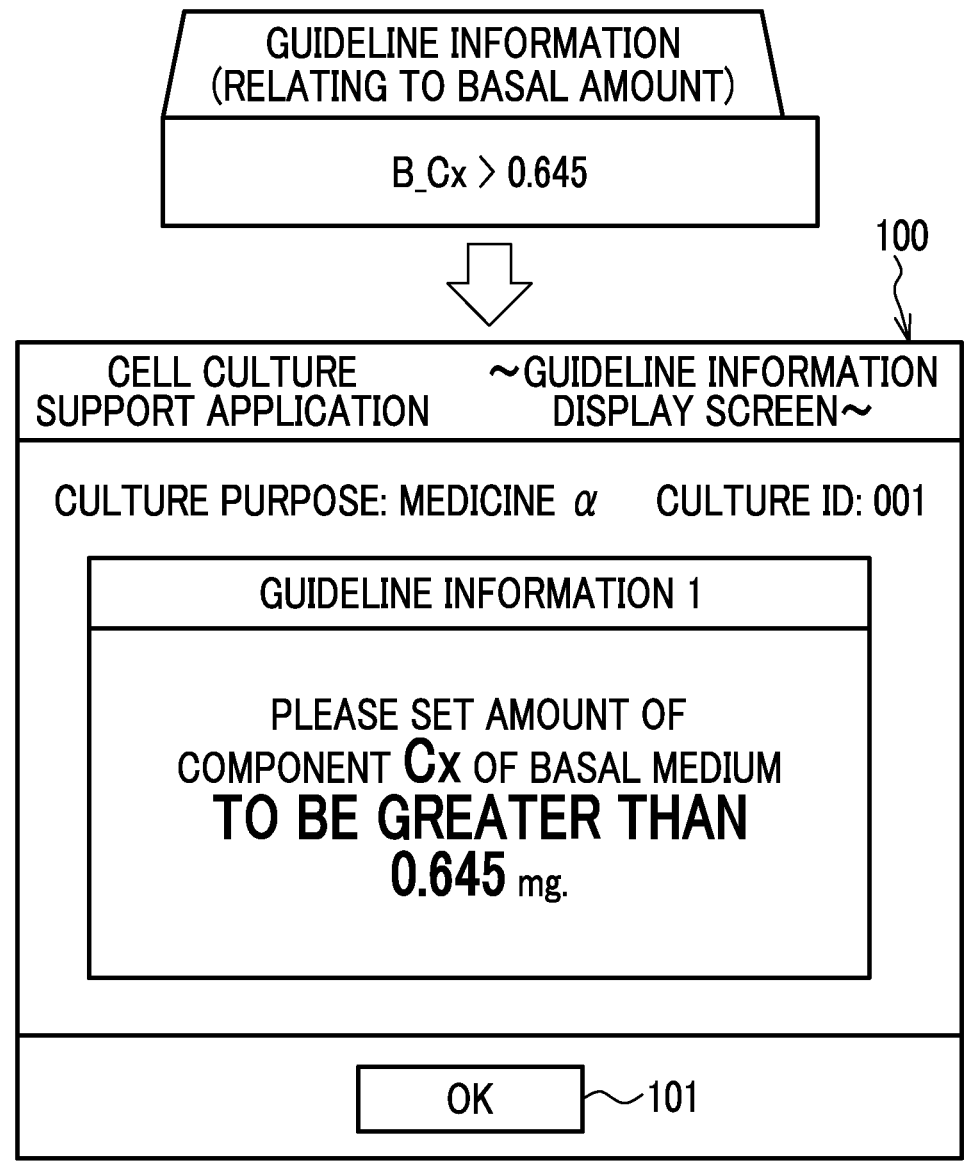
FIG. 18 is a diagram showing a guideline information display screen in the case of FIG. 15.

FIGS. 17 to 19 show examples of the guideline information display screen 100 displayed on the display 34A of the operator terminal 10. The guideline information display screen 100 is generated in the output control unit 53 of the cell culture support server 11, and is output to the operator terminal 10. Then, the guideline information display screen 100 is displayed on the display 34A by the browser control unit 40 of the operator terminal 10. The guideline information display screen 100 does not displays in a case where the OK button 101 is selected.

The guideline information display screen 100 shown in FIG. 17 is an example in which the guideline information of Formula (2) shown in FIG. 14 is displayed. More specifically, a sentence "Please set the supply amount of the component Cw on the seventh culture day to be greater than 1.84 mg." expressing Formula (2) is displayed as guideline information.

The guideline information display screen 100 shown in FIG. 18 is an example in which the guideline information of Formula (4) shown in FIG. 15 is displayed. More specifically, a sentence "Please set the amount of the component Cx of the basal medium to be greater than 0.645 mg." expressing Formula (4) is displayed as guideline information.

The guideline information display screen 100 shown in FIG. 19 is an example in which the guideline information of Formula (7) and the guideline information of Formula (8) shown in FIG. 16 are displayed. More specifically, a sentence "Please set the sum of the supply amounts of the component Cy on the fifth culture day and the sixth culture day to be equal to or less than 21.368 mg." expressing Formula (7) is displayed as guideline information. In addition, a sentence "Please set the supply amount of the component Cz on the fifth culture day to be equal to or less than 298.1 mg." expressing Formula (8) is displayed as guideline information. Note that the guideline information of Formula (7) may be expressed as "Please set the supply amounts of the component Cy on the fifth and sixth days of culture to be equal to or less than 10.684 mg." instead of the above example.

FIGS. 17 to 19 show examples in which only the guideline information relating to the supply amount or only the guideline information relating to the basal amount is derived and displayed, but there is also a case where the guideline information relating to the supply amount and the guideline information relating to the basal amount are simultaneously derived and displayed.

Figure 20:
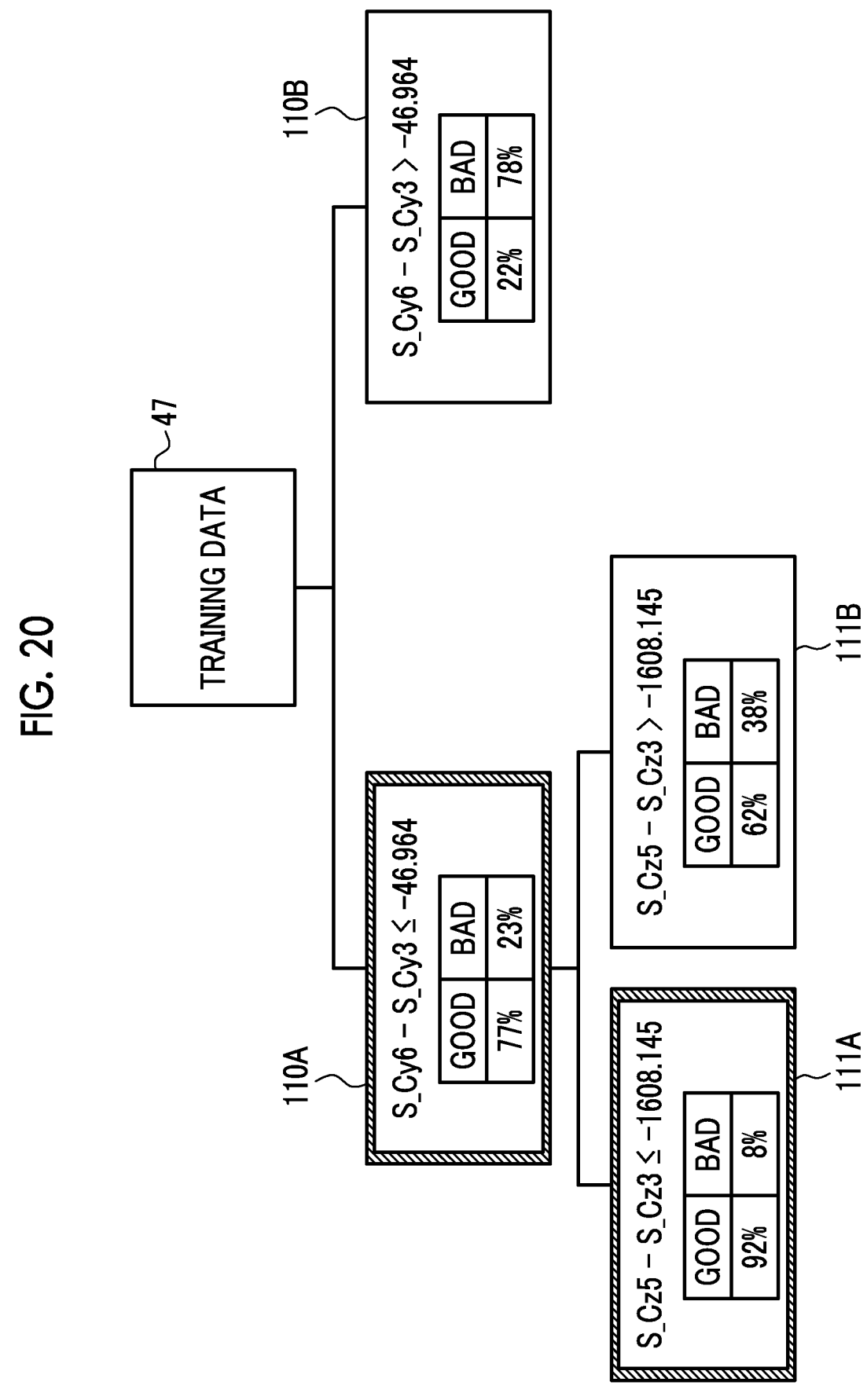
FIG. 20 is a diagram showing a state where the learned model shown in FIG. 16 is derived using decision tree analysis.
Figure 21:
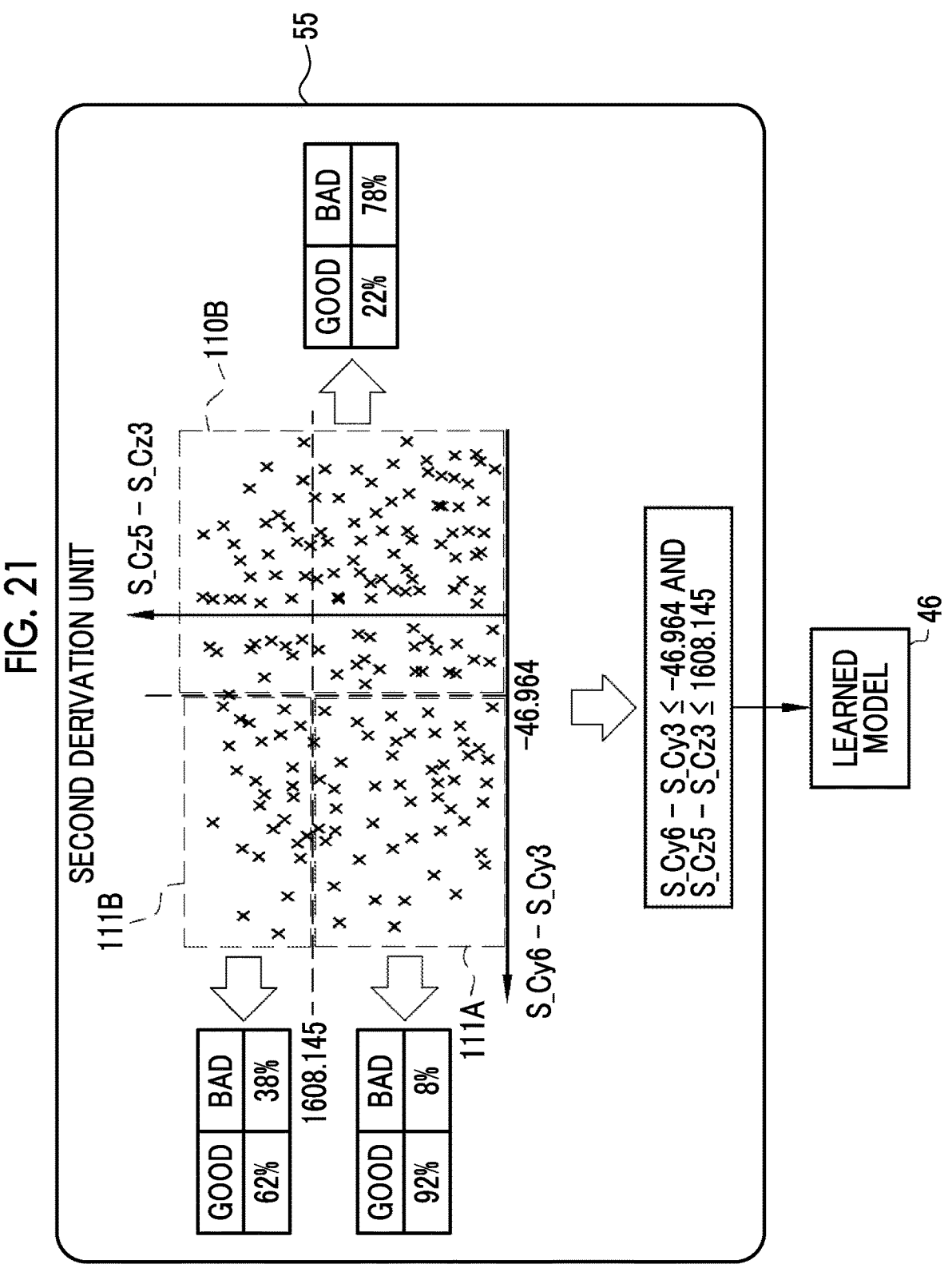
FIG. 21 is a diagram showing a state where the learned model shown in FIG. 16 is derived using decision tree analysis.

As shown in FIGS. 20 and 21, the second derivation unit 55 uses decision tree analysis as a machine learning method for deriving the learned model 46. FIGS. 20 and 21 show an example in which the learned model 46 shown in FIG. 16 is derived.

The second derivation unit 55 derives the learned model 46 in which the proportion of good in good/bad data is equal to or greater than 90% as a final goal. To this end, as a first step, the second derivation unit 55 extracts a condition that allows all the training data 47 from the third acquisition unit 54 to be divided into nodes in which the proportion of good in good/bad data is equal to or greater than 70%. In FIG. 20, in a case where division into two nodes 110A and 110B is performed under two conflicting conditions (S_Cy6-

S_Cy3≤−46.964 and S_Cy6-S_Cy3>−46.964) relating to a day difference (S_Cy6-S_Cy3) of a component Cy between the sixth culture day and the third culture day, the proportion of good in good/bad data of the node 110A is equal to or greater than 70%. Thus, the second derivation unit 55 extracts the condition (S_Cy6-S_Cy3≤−46.964) of the node 110A as a condition that allows division into nodes in which the proportion of good in good/bad data is equal to or greater than 70%.

Subsequently, the second derivation unit 55 extracts a condition that allows the training data 47 of the node 110A to be further divided into nodes in which the proportion of good in good/bad data is equal to or greater than 90%. In FIG. 20, in a case where division into two nodes 111A and 111B is performed under two conflicting conditions (S_Cz5-S_Cz3≤1608.145 and S_Cz5-S_Cz3>1608.145) relating to a day difference (S_Cz5-S_Cz3) of a component Cz between the fifth culture day and the third culture day, the proportion of good in good/bad data of the node 111A is equal to or greater than 90%. Thus, the second derivation unit 55 extracts the condition (S_Cz5-S_Cz3≤1608.145) of the node 111A as a condition that allows division into nodes in which the proportion of good in good/bad data is equal to or greater than 90.

The second derivation unit 55 derives S_Cy6-S_Cy3≤−46.964 and S_Cz5-S_Cz3≤1608.145, which are branch conditions of the nodes 110A and 111A, as the learned model 46.

In FIGS. 20 and 21, the decision tree analysis is dividedly performed in two stages in order to derive the learned model 46, but in a case where the condition that allows the division into nodes in which the proportion of good in good/bad data is equal to or greater than 90% is extracted at the first stage, the decision tree analysis may be then ended. Alternatively, until the condition that allows the division into nodes in which the proportion of good in good/bad data is equal to or greater than 90% is extracted, the decision tree analysis may be continuously performed in a third stage and a fourth stage. However, in a case where the decision tree analysis is continued in too many stages, the number of samples of the training data 47 of the nodes becomes small, and it is difficult to maintain the reliability of the learned model 46. Thus, it is preferable to limit stages of the decision tree analysis (tree depth), for example, to end the decision tree analysis in a case where the number of samples of the training data 47 of the nodes is equal to or less than a set value.

Figure 22:
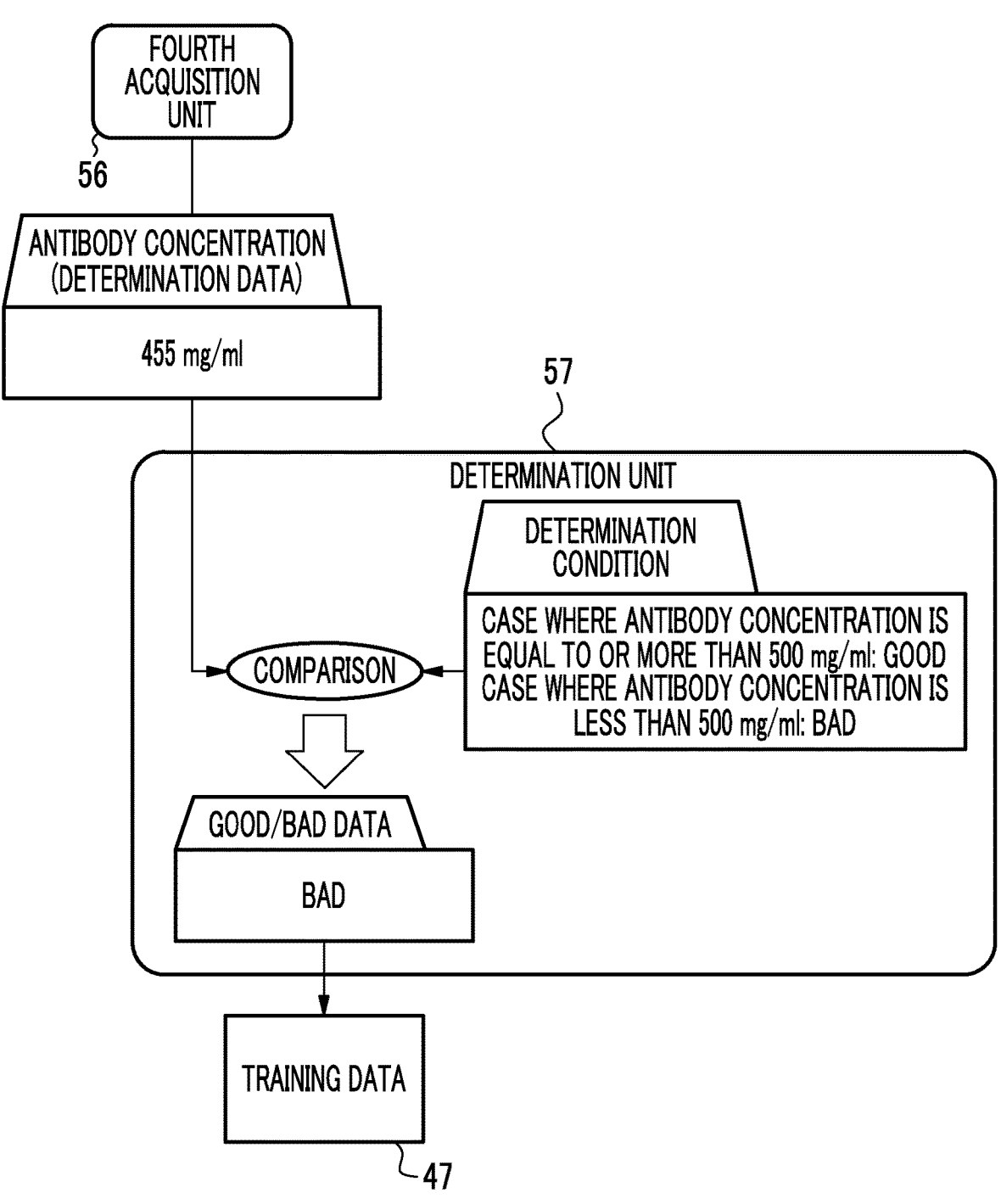
FIG. 22 is a diagram showing a state where a determina- tion unit determines whether the result of cell culture is good or bad.

In FIG. 22, the determination unit 57 determines whether the cell culture result is good or bad by comparing the antibody concentration from the fourth acquisition unit 56 with a preset determination condition. FIG. 22 shows an example in which the cell culture result is good in a case where the antibody concentration from the fourth acquisition unit 56 is 455 mg/ml and the determination condition is that the antibody concentration is equal to or greater than 500 mg/ml and the cell culture result is bad in a case where the antibody concentration from the fourth acquisition unit 56 is 455 mg/ml and the antibody concentration is smaller than 500 mg/ml. In this case, the determination unit 57 determines that the result of cell culture is bad. The determination condition may be fixed, or the operator may change its setting.

Figure 23:
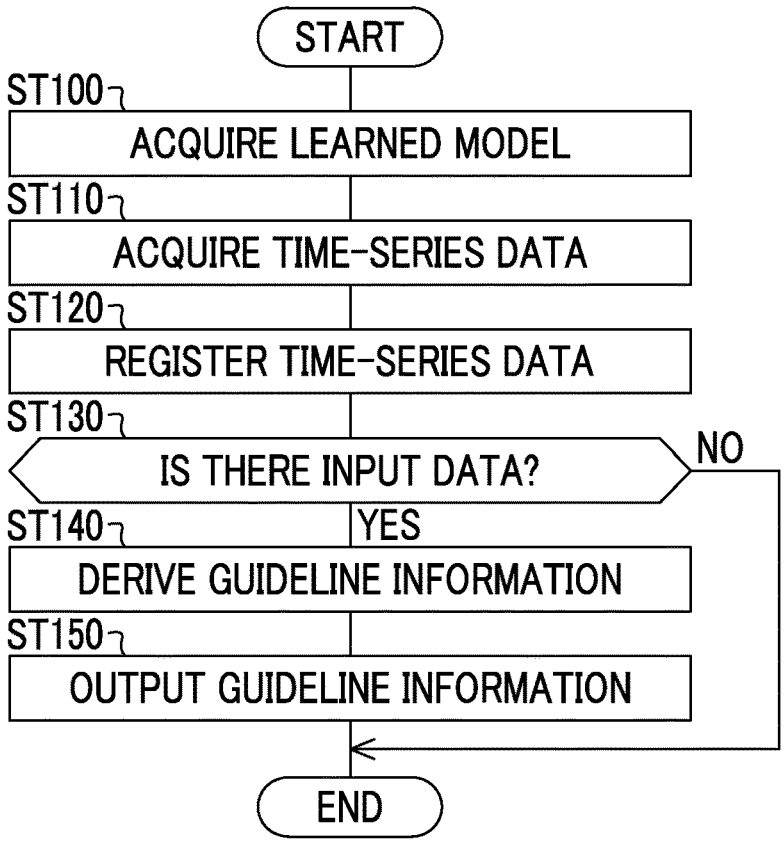
FIG. 23 is a flowchart showing a processing procedure of the cell culture support server.
Figure 24:
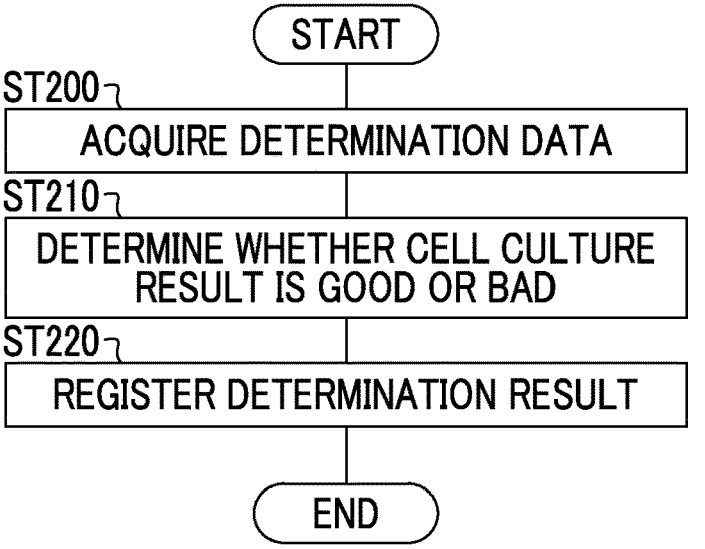
FIG. 24 is a flowchart showing a processing procedure of the cell culture support server.

Hereinafter, an operation based on the above configuration will be described with reference to the flowcharts of FIGS. 23 to 25. First, as shown in FIG. 23, in the cell culture support server 11, the learned model 46 is read out from the storage device 30B to the first acquisition unit 50, so that the learned model 46 is acquired by the first acquisition unit 50

(Step ST100, a first acquisition step). The learned model 46 is output from the first acquisition unit 50 to the first derivation unit 52.

In the operator terminal 10, the second input screen 65B shown in FIG. 12 and the third input screen 65C shown in FIG. 13 are displayed on the display 34A by the browser control unit 40. Then, the basal amount, the measurement amount, and the supply amount are input through each of the input screens 65B and 65C. Each input amount is transmitted to the cell culture support server 11 as an output request and a registration request. Thus, the time-series data is acquired by the second acquisition unit 51 (Step ST110, a second acquisition step). The time-series data is registered in the training data 47 of the storage device 30B as time-series data for learning by the second acquisition unit 51 (Step ST120). The time-series data is output from the second acquisition unit 51 to the first derivation unit 52 as time-series data for analysis. Note that, here, an example in which the registration of the time-series data for learning in the learning phase and the output of the time-series data for analysis to the first derivation unit 52 in the operating phase are performed in parallel is shown, but the registration of the time-series data for learning and the output of the time-series data for analysis to the first derivation unit 52 may be separately performed at different timings.

The first derivation unit 52 retrieves whether there is data that serves as input data in the time-series data for analysis from the second acquisition unit 51 (Step ST130). In a case where there is the data that serves as the input data in the time-series data for analysis (YES in Step ST130), as shown in FIGS. 14 to 16, the first derivation unit 52 derives the guideline information (Step ST140, a first derivation step). More specifically, the first derivation unit 52 derives the guideline information by performing calculation by substituting the input data into an addition formula in which the basal amount, the supply amount, and the metabolic amount indicating the measurement amounts are parameters. The guideline information is output from the first derivation unit 52 to the output control unit 53. On the other hand, in a case where there is no data that serves as the input data in the time-series data for analysis (NO in Step ST130), the guideline information is not derived.

In a case where the guideline information is derived, the output control unit 53 generates screen data of the guideline information display screen 100 shown in FIGS. 17 to 19. The screen data of the guideline information display screen 100 is output to the operator terminal 10 that is an output request source by the output control unit 53 (Step ST150, an output control step).

In the operator terminal 10, the guideline information display screen 100 from the cell culture support server 11 is displayed on the display 34A by the browser control unit 40. The operator browses the guideline information displayed on the guideline information display screen 100, and advances the culture work according to the guideline information. For example, in a case where the guideline information display screen 100 shown in FIG. 17 is displayed, the operator sets the supply amount of the component Cw on the seventh culture day to be greater than 1.84.

Using the learned model 46 showing the guideline of the amounts of the components of the medium, the first derivation unit 52 derives quantitative guideline information of the amounts for obtaining a good result in the cell culture, and the output control unit 53 outputs the guideline information display screen 100 to provide the result for browsing by the operator. Accordingly, it is possible to increase the probability of obtaining good results in cell culture. It is possible for an operator to easily know the optimum values of amounts. Thus, it is not necessary to perform complicated thinking for setting, by trial and error, the supply amount on the basis of an operator's own experience or the like, and it is possible to carry out the culture work without complicatedness in accordance with the guideline information.

Since the guideline information is derived by the first derivation unit 52 by substituting input data into an addition formula in which the basal amount, the supply amount, and the metabolic amount are as parameters, it is possible to derive the guideline information by relatively simple calculation.

In the operator terminal 10, the antibody concentration is input through the third input screen 65C on the last culture day. The input antibody concentration is transmitted to the cell culture support server 11, and is acquired as data for determination by the fourth acquisition unit 56, as shown in FIG. 24 (Step ST200). The antibody concentration is output from the fourth acquisition unit 56 to the determination unit 57.

Subsequently, in the determination unit 57, as shown in FIG. 22, the antibody concentration from the fourth acquisition unit 56 is compared with a determination condition, so that good or bad of the cell culture result is determined (Step ST210). Then, the determination unit 57 registers the determination result in the training data 47 as good/bad data (Step ST220).

In this way, since the fourth acquisition unit 56 acquires the data for determination, and the determination unit 57 determines good or bad of the cell culture result on the basis of the data for determination, the operator only needs to input the data for determination, and does not need to determine whether the result of cell culture is good or bad.

Figure 25:
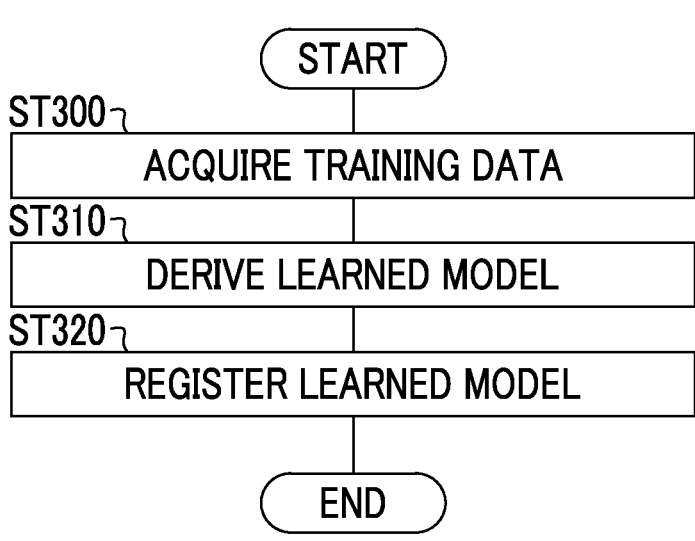
FIG. 25 is a flowchart showing a processing procedure of the cell culture support server.

As shown in FIG. 25, in the cell culture support server 11, the training data 47 is read out from the storage device 30B to the third acquisition unit 54 at a preset timing, so that the training data 47 is acquired by the third acquisition unit 54 (Step ST300). The training data 47 is output from the third acquisition unit 54 to the second derivation unit 55.

In the second derivation unit 55, as shown in FIGS. 20 and 21, the training data 47 is subjected to the decision tree analysis, and thus the learned model 46 is derived (Step ST310). The learned model 46 is registered in the storage device 30B by the second derivation unit 55 (Step ST320).

In this way, since the third acquisition unit 54 acquires the training data 47 and the second derivation unit 55 derives the learned model 46 on the basis of the training data 47, it is possible to update the learned model 46 according to the training data 47 updated every day. Further, it is possible to save an effort for providing the learned model 46 from another computer.

The learned model 46 is an inequality relating to a measurement amount derived by the second derivation unit 55 using the decision tree analysis. Accordingly, it is possible to easily interpret what content the learned model 46 shows. As a result, the guideline information derived on the basis of the learned model 46 can be expressed by a simple sentence or the like as illustrated in FIGS. 17 to 19.

In the above embodiment, an example in which the learned model 46 and the training data 47 are registered in the storage device 30B of the cell culture support server 11 is shown, but the present invention is not limited thereto. A configuration in which the learned model 46 and the training data 47 are registered in a database server different from the cell culture support server 11 and the learned model 46 and the training data 47 are transmitted from the database server to the cell culture support server 11 may be used.

In the above embodiment, the antibody concentration is exemplified as the data for determination, but the present invention is not limited thereto. Instead of the antibody concentration or in addition thereto, the concentration of impurities, the cell aggregation density, and a parameter indicating a cell shape such as a circularity shape may be used as the data for determination.

The measurement amount may be transmitted from a mass spectrometer, instead of being manually input by the operator through the input screens 65B and 65C as in the above embodiment.

In the above embodiment, an example in which various screens such as the guideline information display screen 100 are output from the output control unit 53 to the operator terminal 10 in the form of screen data for web distribution is shown, but the present invention is not limited thereto. A configuration in which an application program for displaying various screens is installed in the operator terminal 10 and a command for instructing the application program to display various screens is output from the output control unit 53 may be used.

The output form of the guideline information is not limited to the guideline information display screen 100 of the above embodiment. The guideline information may be printed by a printer connected to the operator terminal 10, or a file indicating the guideline information may be transmitted to the operator terminal 10 by e-mail.

The machine learning method is not limited to the decision tree analysis. Other methods such as a neural network may be used.

Various modifications may be made to the hardware configuration of the computer that configures the cell culture support server 11. For example, the cell culture support server 11 may be configured of a plurality of server computers separated as hardware for the purpose of improving processing capacity and reliability. Specifically, the functions of the first acquisition unit 50, the second acquisition unit 51, the first derivation unit 52, and the output control unit 53, the functions of the third acquisition unit 54 and the second derivation unit 55, and the functions of the fourth acquisition unit 56 and the determination unit 57 may be assigned to three server computers in a distributed manner. In this case, the cell culture support server 11 is configured by three server computers.

The functions of the second acquisition unit 51 and the fourth acquisition unit 56 may be assigned to one acquisition unit. Further, a configuration in which the operating program 45 is installed in the operator terminal 10, each processing unit built in the cell culture support server 11 in the above embodiment is built in the operator terminal 10, and the operator terminal 10 is operated as the cell culture support apparatus may be used.

In this way, the hardware configuration of the computer may be appropriately modified according to necessary performance such as processing capacity, security, and reliability. Further, as well as the hardware, the application program such as the operating program 45 may be duplicated or stored in a plurality of storage devices in a distributed manner for the purpose of ensuring security and reliability.

In the above embodiment, a configuration in which the cell culture support server 11 is installed in one medicine development laboratory and is used in one medicine development laboratory is shown, but a configuration in which the cell culture support server 11 is used in a plurality of medicine development laboratories may be used. In order to make the cell culture support server 11 available in a plurality of medicine development laboratories, the cell culture support server 11 is connected to a plurality of operator terminals 10 installed in the plurality of medicine development laboratories through a wide area network (WAN) such as the Internet or a public communication network. Then, the cell culture support server 11 receives an output request from each operator terminal 10 through the WAN, and outputs guideline information to each operator terminal 10. In this case, an installation location and an operating party of the cell culture support server 11 may be, for example, a data center operated by a company other than the medicine development laboratories, or one of the plurality of medicine development laboratories.

In addition, in the above embodiment, it is assumed that an operator prepares a basal medium or supplies components every day. Thus, in the above embodiment, the guideline information for the operator is output. However, a configuration in which the apparatus prepares the basal medium or supplies the components every day without through the operator may be considered. In this case, the guideline information serves as control information for the apparatus. For example, in a case where the guideline information shows that the supply amount of the component Cw on the seventh culture day shown in FIG. 14 is greater than 1.84, control information for setting the supply amount of the component Cw on the seventh culture day to be greater than 1.84 is given to the apparatus as guideline information. By doing so, it is possible to deal with a case where the apparatus prepares the basal medium or supplies the components every day without the aid of the operator.

In the above embodiment, for example, as a hardware structure of processing units that execute various processes, such as the first acquisition unit 50, the second acquisition unit 51, the first derivation unit 52, the output control unit 53, the third acquisition unit 54, the second derivation unit 55, the fourth acquisition unit 56, and the determination unit 57, the following various processors may be used. As described above, in addition to the CPU 32B that is a general-purpose processor that executes software (operating program 45) to function as various processing units, various processors include a programmable logic device (PLD) that is a processor of which a circuit configuration is changeable after manufacturing, such as a field programmable gate array (FPGA), a dedicated electrical circuit that is a processor having a circuit configuration specifically designed to execute a specific process, such as an application specific integrated circuit (ASIC), or the like.

One processing unit may be configured by one of these various processors, or may be configured by a combination of two or more processors of the same type or different types (for example, a combination of a plurality of FPGAs and/or a combination of a CPU and an FPGA). Further, a plurality of processing units may be configured by one processor.

As an example in which the plurality of processing units is configured by one processor, first, as represented by a computer such as a client and a server, there is a configuration in which one processor is configured by a combination of one or more CPUs and software and the processor functions as a plurality of processing units. Secondly, as represented by a system on chip (SoC) or the like, there is a configuration in which a processor that realizes the functions of the entire system including a plurality of processing units by one integrated circuit (IC) chip is used. As described above, the various processing units are configured using one or more of the above various processors as a hardware structure.

Further, as a hardware structure of these various processors, more specifically, electric circuitry in which circuit elements such as semiconductor elements are combined may be used.

From the above description, the invention described in supplementary note 1 below can be understood.

[Supplementary Note 1]

A cell culture support apparatus comprising:

a first acquisition processor that acquires a learned model, derived by performing machine learning on the basis of a set of time-series data for learning indicating a time transition of an amount of each of plural types of components constituting a medium used for cell culture and good/bad data indicating good or bad of a result of the cell culture in correspondence with the time-series data for learning, indicating a guideline of the amount;

a second acquisition processor that acquires time-series data for analysis indicating the time transition of the amount;

a first derivation processor that derives quantitative guideline information of the amount for obtaining a good result in the cell culture, with respect to at least one of the plural types of components, from the learned model acquired in the first acquisition processor and input data of at least a part of the time-series data for analysis acquired in the second acquisition processor; and an output control processor that performs a control for outputting the guideline information.

The technique of the present disclosure may be appropriately combined with the above-described various embodiments and various modifications. Further, it is needless to say that the above embodiments are not limiting and various configurations may be adopted within a scope without departing from the concept of the present disclosure. Furthermore, the technique of the present disclosure extends to a storage medium that stores the program in a non-temporary manner, in addition to the program.

The above-described content and the above-illustrated content are detailed descriptions of portions related to the technique of the present disclosure, which are merely an example of the technique of the present disclosure. For example, the description of the above configurations, functions, operations, and effects is an example of description of configurations, functions, operations, and effects of portions related to the technique of the present disclosure. Therefore, within the scope without departing from the concept of the technique of the present disclosure, unnecessary portions may be removed, new elements may be added or replaced for the above-described content and the above-illustrated content. In addition, in order to avoid complication and facilitate understanding of the portions related to the technique of the present disclosure, in the above-described content and the above-illustrated content, description of common knowledge or the like that does not need special explanation in implementing the technique of the present disclosure is omitted.

In the present specification, "A and/or B" is synonymous with "at least one of A or B". That is, "A and/or B" may refer to only A, only B, or a combination of A and B. In addition, in the present specification, the same concept as "A and/or B" is also applied to a case where three or more matters are linked by "and/or".

All documents, patent applications and technical standards disclosed in this specification are incorporated in this specification by reference in such a manner that the incorporation by reference of individual document, patent application and technical standard are handled to the same extent as in specific and individual description thereof.

What is claimed is:

1. A non-transitory computer-readable storage medium storing a program for operating a cell culture support apparatus that causes a computer to execute:

acquiring a learned model, derived by performing machine learning by using a set of time-series data for learning and result data as training data, the set being obtained from a storage device, the time-series data for learning indicating a time transition of an amount of each of plural types of components constituting a medium used for cell culture, and the result data indicating a good result or a bad result of the cell culture performed in accordance with the time transition of the amount of each of the plural types of components of the time-series data for learning, the learned model indicating a guideline of the amount representing the amount of each of the plural types of components for obtaining the good result in the cell culture, the good result and the bad result being determined based on antibody concentration contained in the culture medium after the cell culture;

acquiring time-series data for analysis from an operator terminal, the time-series data for analysis indicating the time transition of the amount of each of the plural types of components during a period of cell culture;

upon receiving input data for at least one of the time-series data for analysis, deriving guideline information of the amount for obtaining the good result in the cell culture from the learned model and the time-series data for analysis that has been received by the time at which the input data was received, the guideline information indicating whether the amount of each of the plural types of components should be larger or less than a value obtained by the learned model;

performing a control for outputting the guideline information to the operator terminal, wherein the guideline information is delivered by performing a calculation by using the input data which include a basal amount that is an amount of each of the plural types of components in a basal medium prepared prior to starting of the cell culture, a supply amount that is an amount of at least one of the plural types of components supplied every day in the period of the cell culture of a plurality of days, and a metabolic amount that is an amount that cells metabolize; and setting the supply amount of each of the plural types of components based on the guideline information that was outputted and controlling a culturing device to make the culture based on the supply amount that was set.

2. The non-transitory computer-readable storage medium according to claim 1, wherein the guideline information is information relating to the basal amount or information relating to the supply amount for obtaining the good result in the cell culture.

3. The non-transitory computer-readable storage medium according claim 1, wherein the time-series data for analysis is stored as the time-series data for learning in the storage device, and the learned model includes an inequality relating to the measurement amount.

4. The non-transitory computer-readable storage medium according to claim 1, the program causing the computer to further execute:

acquiring data for determination for determining whether a result of the cell culture is a good result or a bad result from an operator terminal; and determining whether the result data is the good result or the bad result on the basis of the data for determination.

5. The non-transitory computer-readable storage medium according to claim 1, wherein a technique of the machine learning uses a decision tree analysis.

6. A cell culture support apparatus comprising:

at least one processor, wherein the processor is configured to:

acquire a learned model, derived by performing machine learning by using a set of time-series data for learning and result data as training data, the set being obtained from a storage device, the time-series data for learning indicating a time transition of an amount of each of plural types of components constituting a medium used for cell culture and the result data indicating a good result or a bad result of the cell culture performed in accordance with the time transition of the amount of each of the plural types of components of the time-series data for learning, the learned model indicating a guideline of the amount representing the amount of each of the plural types of components for obtaining the good result in the cell culture, the good result and the bad result being determined based on antibody concentration contained in the culture medium after the cell culture;

acquire time-series data for analysis from an operator terminal, the time-series data for analysis indicating the time transition of the amount of each of the plural types of components during a period of cell culture;

upon receiving input data for at least one of the time-series data for analysis, derive guideline information of the amount for obtaining the good result in the cell culture from the learned model and the time-series data for analysis that has been received by the time at which the input data was received, the guideline information indicating whether the amount of each of the plural types of components should be larger or less than a value obtained by the learned model;

perform a control for outputting the guideline information to the operator terminal, wherein the guideline information is delivered by performing a calculation by using the input data which include a basal amount that is an amount of each of the plural types of components in a basal medium prepared prior to starting of the cell culture, a supply amount that is an amount of at least one of the plural types of components supplied every day in the period of the cell culture of a plurality of days, and a metabolic amount that is an amount that cells metabolize; and set the supply amount of each of the plural types of components based on the guideline information that was outputted and controlling a culturing device to make the culture based on the supply amount that was set.

7. A method for operating a cell culture support apparatus, the method comprising:

acquiring a learned model, derived by performing machine learning by using a set of time-series data for learning and result data as training data, the set being obtained from a storage device, the time-series data for learning indicating a time transition of an amount of each of plural types of components constituting a medium used for cell culture and the result data indicating a good result or a bad result of the cell culture performed in accordance with the time transition of the amount of each of the plural types of components of the time-series data for learning, the learned model indicating a guideline of the amount representing the amount of each of the plural types of components for obtaining the good result in the cell culture, the good result and the bad result being determined based on antibody concentration contained in the culture medium after the cell culture;

acquiring time-series data for analysis from an operator terminal, the time-series data for analysis indicating the time transition of the amount of each of the plural types of components during a period of cell culture;

upon receiving input data for at least one of the time-series data for analysis, deriving guideline information of the amount for obtaining the good result in the cell culture from the learned model acquired and the time-series data for analysis acquired that has been received by the time at which the input data was received, the guideline information indicating whether the amount of each of the plural types of components should be larger or less than a value obtained by the learned model;

performing a control for outputting the guideline information to the operator terminal, wherein the guideline information is delivered by performing a calculation by using the input data which include a basal amount that is an amount of each of the plural types of components in a basal medium prepared prior to starting of the cell culture, a supply amount that is an amount of at least one of the plural types of components supplied every day in the period of the cell culture of a plurality of days, and a metabolic amount that is an amount that cells metabolize; and setting the supply amount of each of the plural types of components based on the guideline information that was outputted and using the supply amount to make a cell culture based on the supply amount that was set.

* * * * *